(12) United States Patent
Sherwin et al.

(10) Patent No.: US 11,861,686 B2
(45) Date of Patent: *Jan. 2, 2024

(54) ACTIONABLE WIDGET CARDS

(71) Applicant: Wix.com Ltd, Tel Aviv (IL)

(72) Inventors: Reuven J. Sherwin, Ra'anana (IL); Tal Kol, Hod Hasharon (IL); Adi Zellner, Ramat Hasharon (IL); Yonatan Biri, Tel Aviv (IL); Shachar Burg, Atlit (IL); Ethan Sharabi, Tel Aviv (IL); Liat Karpel Gurwicz, Hod Hasharon (IL); Roni Ben-Aharon, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 227 days.

This patent is subject to a terminal disclaimer.

(21) Appl. No.: 17/396,779

(22) Filed: Aug. 9, 2021

(65) Prior Publication Data

US 2021/0366035 A1 Nov. 25, 2021

Related U.S. Application Data

(63) Continuation of application No. 15/850,151, filed on Dec. 21, 2017, now Pat. No. 11,087,389.

(Continued)

(51) Int. Cl.
*G06Q 30/00* (2023.01)
*G06Q 30/0601* (2023.01)
(Continued)

(52) U.S. Cl.
CPC .......... *G06Q 30/0643* (2013.01); *G06F 8/34* (2013.01); *G06F 9/451* (2018.02); *G06F 40/186* (2020.01); *G06N 5/04* (2013.01)

(58) Field of Classification Search
CPC ... G06Q 30/0643; G06F 9/451; G06F 40/186; G06F 8/34; G06N 5/04
See application file for complete search history.

(56) References Cited

U.S. PATENT DOCUMENTS 6,640,249 B1   10/2003   Bowman-Amuah
8,171,128 B2   5/2012   Zuckerberg
(Continued)

OTHER PUBLICATIONS

Kokil et al., "Developing Cross Platform Secured Mobile Widgets using Subject-Role based Access Control Mechanism," International Journal of Computer Applications, V52n22, Nov. 2012, 9pgs. (Year: 2012).*

(Continued)

*Primary Examiner* — Robert M Pond
(74) *Attorney, Agent, or Firm* — HEIDI BRUN ASSOCIATES LTD.

(57) ABSTRACT

A system and method for a website building system (WBS) hosting multiple websites, and a message system to generate at least one actionable widget card (AWC), where the AWC has elements comprising at least content, fields and attributes and implements at least e-commerce related operations for a product, the message system includes a card creator to create at least one AWC according to a trigger from a website associated with the product, stored pre-defined rules concerning card definitions or pre-defined widget card parameters and a card transformer to transform at least one of: content, fields and attributes of the at least one AWC according to transformation rules to create at least one new AWC, where a transformation is according to at least one of: a user request, related elements and product similarity.

20 Claims, 20 Drawing Sheets

Related U.S. Application Data

(60) Provisional application No. 62/580,495, filed on Nov. 2, 2017, provisional application No. 62/437,324, filed on Dec. 21, 2016.

(51) Int. Cl.
  *G06N 5/04* (2023.01)
  *G06F 9/451* (2018.01)
  *G06F 8/34* (2018.01)
  *G06F 40/186* (2020.01)

(56) References Cited

U.S. PATENT DOCUMENTS

| | | | |
|---|---|---|---|
| 9,008,416 B2 | 4/2015 | Movellan | |
| 9,747,258 B2 | 8/2017 | Ben-Aharon | |
| 10,505,875 B1 | 12/2019 | Jenks | |
| 11,087,389 B2 * | 8/2021 | Sherwin | G06F 9/451 |
| 2008/0097871 A1 * | 4/2008 | Williams | G06Q 99/00 |
| | | | 705/500 |
| 2009/0288014 A1 | 11/2009 | Fujioka | |
| 2010/0107053 A1 | 4/2010 | Kanzaki | |
| 2011/0214078 A1 | 9/2011 | Klask | |
| 2012/0167004 A1 | 6/2012 | Gordner | |
| 2012/0290959 A1 | 11/2012 | Quine | |
| 2013/0219263 A1 | 8/2013 | Abrahami | |
| 2014/0157185 A1 | 6/2014 | Moromisato | |
| 2014/0180790 A1 | 6/2014 | Boal | |
| 2014/0258843 A1 | 9/2014 | Krueger | |
| 2014/0282218 A1 | 9/2014 | Kaufman | |
| 2015/0089354 A1 | 3/2015 | Abrahami | |
| 2015/0227270 A1 | 8/2015 | Yun | |
| 2016/0103563 A1 | 4/2016 | Greenberg | |
| 2016/0124839 A1 | 5/2016 | Mordo | |
| 2016/0231879 A1 | 8/2016 | Sirpal | |
| 2016/0231908 A1 | 8/2016 | Sirpal | |
| 2016/0350422 A1 | 12/2016 | Abrahami | |
| 2016/0371312 A1 | 12/2016 | Ben-Aharon | |
| 2017/0017634 A1 | 1/2017 | Levine | |
| 2017/0032050 A1 | 2/2017 | Kol | |

OTHER PUBLICATIONS

International Search Report for corresponding PCT application PCT/IB2017/058303 dated May 29, 2018.

Supplementary European Search Report for corresponding European application 17 88 4579.8 dated Apr. 14, 2020.

Jankowski Stanislaw et al., "Deep Learning classifier based on NPCA and orthogonal feature selection", Proceedings of SPIE, vol. 10031, Sep. 28, 2016.

* cited by examiner

FIG. 1C

| NEW MESSAGE! ✓ | OUT OF STOCK ✓ | INVOICE OVERDUE ✓ | INVOICE PAID ✓ |
|---|---|---|---|
| MARK BURG WROTE: *"THIS IS A GREAT ARTICLE! I REALLY ENJOYED READING IT AND..."* | VANILLA CUPCAKES | YOUR INVOICE TO BEN COHEN WAS DUE 5 DAYS AGO. BALANCE DUE: $220 | BEN COHEN PAID YOU $220 FULLY PAID |
| 22.11.16, 10:22AM | YESTERDAY, 15:50 | YESTERDAY, 16:50 | 22.11.16, 10:22AM |

| CANCELED BOOKING ✓ | SAME ROOM CHECK ✓ IN & OUT | PAY YOUR NEXT ✓ YEARLY SUBSCRIPTION | LAURA'S ORDER IS ✓ WAITING |
|---|---|---|---|
| MATAN WAISSMAN HAS CANCELED TRX TRAINING. TODAY, 16:00   PAID | BETTY IS CHECKING IN TO SINGLE ROOM, REMIND LISA TO CHECK OUT. | PAY YOUR NEXT YEAR'S SUBSCRIPTION | YOU HAVE AN UNFULFILLED ORDER FROM LAST WEEK. GO AHEAD AND FULFILL IT! |
| 22.11.16, 10:22AM | 22.11.16, 10:22AM | 22.11.16, 10:22AM | 22.11.16, 10:22AM |

| LAURA'S ORDER IS ✓ WAITING | SENDING YOUR ✓ SHIPMENT TODAY? | NEW POST! ✓ | |
|---|---|---|---|
| MORNING! LAURA COHEN'S ORDER IS WAITING...HAVE YOU ALREADY FULFILLED IT? | TAP HERE TO SEND THE TRACKING ID TO LAURA COHEN (ORDER #234) | MAI BIRI WROTE A NEW POST "I LOVE MY CUPCAKES." IT'S TIME FOR YOUR REVIEW. | |
| 22.11.16, 10:22AM | | | |

FIG. 1E-2

PLAN AHEAD/PRO TIPS

SUMMER IS ALMOST HERE

SURPRISE YOUR CUSTOMERS WITH A S A L E!

CHRISTMAS IS ALMOST HERE

CHRISTMAS IS JUST AROUND THE CORNER AND EVERYONE IS LOOKING FOR SPECIAL DISCOUNTS, SO GO AHEAD AND UPDATE YOUR STORE.

VALLERY SHOES NEEDS A CHANGE

LAST WEEK 4 VISITORS LOOKED AT "VALLERY SHOES" BUT LEFT WITHOUT PURCHASING IT. MAYBE IT'S TIME TO APPLY A DISCOUNT TO THIS PRODUCT?

VALLERY SHOES NEEDS A CHANGE

LAST WEEK 4 VISITORS LOOKED AT "VALLERY SHOES" BUT LEFT WITHOUT PURCHASING IT. MAYBE IT'S TIME TO REFRESH THE PRODUCT'S PHOTOS?

IT'S TIME TO RESEARCH YOUR STORE

IT'S BEEN AWHILE SINCE YOU'VE HAD A PURCHASE. MAYBE IT'S TIME TO UPLOAD A NEW PRODUCT?

VALLERY SHOES NEEDS A CHANGE

LAST WEEK 4 VISITORS LOOKED AT "VALLERY SHOES" BUT LEFT WITHOUT PURCHASING IT. MAYBE IT'S TIME TO REFRESH THE PRODUCT'S DESCRIPTIONS?

IT'S TIME TO WRITE YOUR NEXT BLOG POST

IT'S BEEN ALREADY 8 DAYS SINCE YOUR LAST POST... YOUR FOLLOWERS WANT TO HEAR FROM YOU, GO AND PUBLISH YOUR NEXT POST!

IT'S TIME TO WRITE YOUR NEXT BLOG POST

IT'S ALMOST FRIDAY. MORE PEOPLE READ YOUR POSTS ON 'FRIDAY', IT'S TIME TO GET ANOTHER POST READY.

IT'S TIME TO WRITE YOUR NEXT BLOG POST

4 BLOG POSTS IS NICE, BUT NOT ENOUGH TO BECOME A SUCCESSFULL BLOGGER. DON'T BE LAZY AND PUBLISH YOUR NEXT POST!

IT'S TIME TO WRITE YOUR NEXT BLOG POST

DID YOU KNOW THAT SUCCESSFUL BLOGS PUBLISH AT LEAST 3 POSTS EVERY WEEK. WANT TO BE SUCCESSFUL? GET TO WORK.

HOT TOPIC ALERT!

EVERYONE IS TALKING ABOUT DONALD TRUMP THESE DAYS. BE TRENDY AND WRITE YOUR THOUGHTS.

SEND BEAUTIFUL EMAILS

PROMOTE SALES, EVENTS, PRODUCTS, NEW SERVICES & MORE RIGHT FROM YOUR PHONE.

FIG. 1F

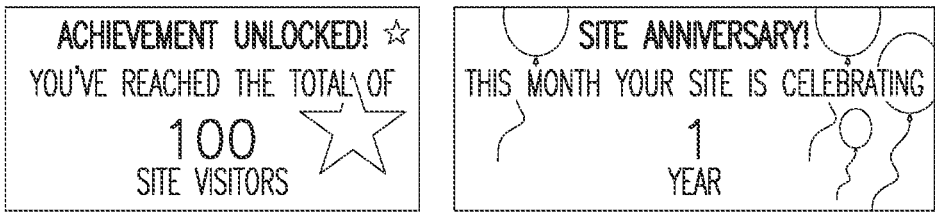
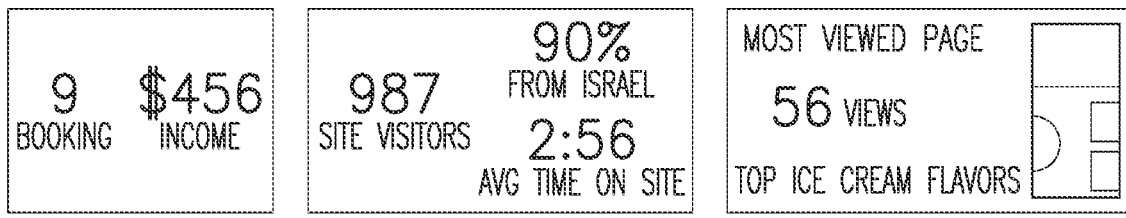
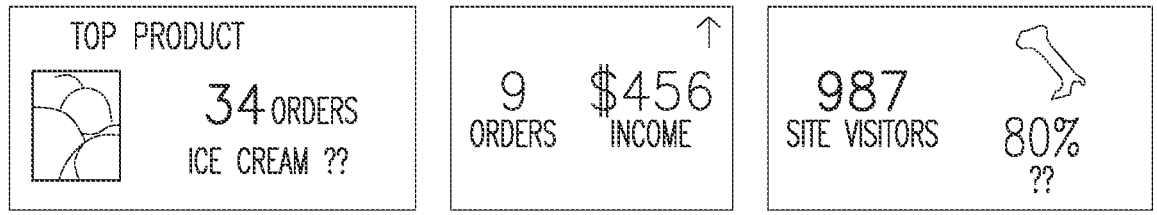
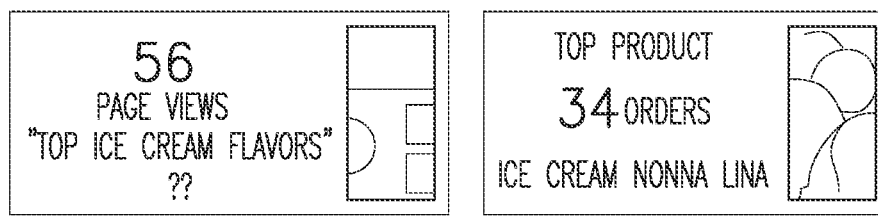
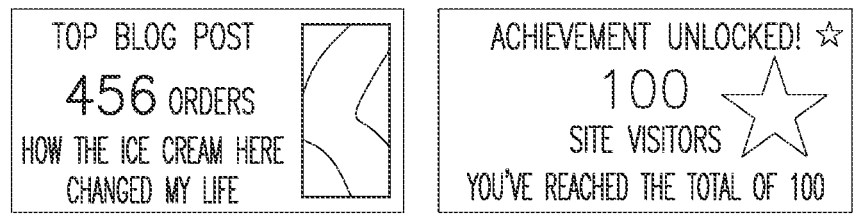
FIG. 1G-1

ACTIONABLE WIDGET CARDS

CROSS REFERENCE TO RELATED APPLICATIONS

This application is a continuation of U.S. application Ser. No. 15/850,151 filed Dec. 21, 2017, which claims priority from U.S. provisional patent applications 62/437,324 filed Dec. 21, 2016 and 62/580,495, filed Nov. 2, 2017 all of which are incorporated herein in their entirety by reference.

FIELD OF THE INVENTION

The present invention relates to website building systems generally and to widget cards in particular.

BACKGROUND OF THE INVENTION

Message notification systems are known in the art such as cellular phone SMS (short message service), MMS (multimedia message service) and push notifications which facilitate message notification in the form of a pop up card. Message notifications are also known in the realm of websites as part of the main site and are provided synchronously as part of the user's workflow, for example when booking a hotel online, a notification may inform the user that there are only 2 rooms left or that a particular offer or discount is about to end.

Existing prior art systems include mobile device notification systems such as notifications received via the Android operating system (commercially available from Google Inc.) in which a typical notification includes icon+title+text+action(s) and the Google Now personal assistant application (commercially available from Google Inc), which supports specialized cards including those generated by third party applications.

Other prior art systems include the Apple iOS "Today" widget (commercially available from Apple Inc.) which may be pulled from the top of the display to show the date, upcoming meetings, weather and application messages and notifications and social networking systems (such as Facebook available from Facebook.inc) which provide a data feed consisting of news items and updates.

SUMMARY OF THE PRESENT INVENTION

Brief Description of the Drawings

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
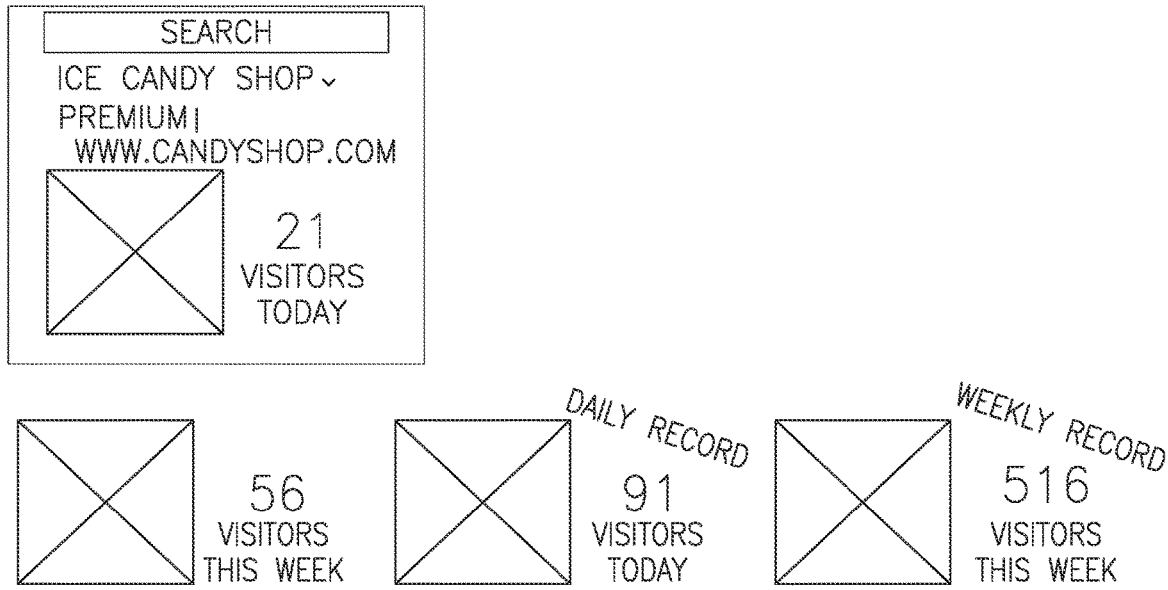
FIGS. 1A to 1R are schematic illustrations of different types and sub-types of actionable widget cards; constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE PRESENT INVENTION

There is provided, in accordance with a preferred embodiment of the present invention, a system for a website building system (WBS) hosting multiple websites, the system includes at least one processor and a message system running on the at least one processor to generate at least one actionable widget card for a user of a website built by the WBS, where the actionable widget card has elements comprising at least content, fields and attributes and implements at least e-commerce related operations for a product. The message system includes a card creator to create at least one actionable widget according to a trigger from a website associated with the product, stored pre-defined rules concerning card definitions or pre-defined widget card parameters; and a card transformer to transform at least one of: content, fields and attributes of the at least one actionable widget card according to transformation rules to create at least one new actionable widget card, and where a transformation is according to at least one of: a user request, related elements and product similarity.

Moreover, in accordance with a preferred embodiment of the present invention, the message system enables communication via the actionable widget card between at least one of: the WBS and the website, the website and at least one end user of the website and-between a user of the WBS and a second user of the WBS.

Further, in accordance with a preferred embodiment of the present invention, the card transformer merges at least two actionable widget cards into a single actionable widget card according to at least one of: user interests and product similarity.

Still further, in accordance with a preferred embodiment of the present invention, the card transformer splits at least one actionable widget card into at least two actionable widget cards.

Additionally, in accordance with a preferred embodiment of the present invention, transformation rules are at least one of: generic system level rules and site-specific rules.

Moreover, in accordance with a preferred embodiment of the present invention, the transformation is according to a product comparison between the product and at least one like second product via a product semantic tree.

Further, in accordance with a preferred embodiment of the present invention, the transformation is according to product matching between the product and at least one like second product having a similar product classification or attributes.

Still further, in accordance with a preferred embodiment of the present invention, the product matching includes matching of partially specified business objects.

Additionally, in accordance with a preferred embodiment of the present invention, the transformation affects sorting order of the at least one actionable widget card for display.

Further, in accordance with a preferred embodiment of the present invention, the trigger is one of: a direct action of the user, a request from the user, an external real-world sensor event; a time-based activity and business or design analysis of the website.

There is provided, in accordance with a preferred embodiment of the present invention, system a method for a website building system (WBS) hosting multiple websites, the method includes generating at least one actionable widget card for a user of a website built by the WBS, where the actionable widget card has elements comprising at least content, fields and attributes and implements at least e-commerce related operations for a product. The generating includes creating at least one actionable widget card according to a trigger from a website associated with the product, stored pre-defined rules concerning card definitions or pre-defined widget card parameters; and transforming at least one of: content, fields and attributes of the at least one actionable widget card according to transformation rules to create at least one new actionable widget card, and where a transformation is according to at least one of: a user request, related elements and product similarity.

Moreover, in accordance with a preferred embodiment of the present invention, the at least one actionable widget card enables communication between at least one of: the WBS and the website, the website and at least one end user of the website and-between the user of the WBS and a second user of the WBS.

Further, in accordance with a preferred embodiment of the present invention the transforming merges at least two actionable widget cards into a single actionable widget card according to at least one of: user interests and product similarity.

Still further, in accordance with a preferred embodiment of the present invention, the transforming splits at least one actionable widget card into at least two actionable widget cards.

Additionally, in accordance with a preferred embodiment of the present invention, the transformation rules are at least one of: generic system level rules and site-specific rules.

Moreover, in accordance with a preferred embodiment of the present invention, the transformation is according to a product comparison between the product and at least one like second product via a product semantic tree.

Further, in accordance with a preferred embodiment of the present invention, the transformation is according to product matching between the product and at least one like second product having a similar product classification or attributes.

Still further, in accordance with a preferred embodiment of the present invention, the product matching includes matching of partially specified business objects.

Additionally, in accordance with a preferred embodiment of the present invention, the transformation affects sorting order of the at least one actionable widget card for display.

Moreover, in accordance with a preferred embodiment of the present invention, the trigger is one of: a direct action of the user, a request from the user, an external real-world sensor event; a time-based activity and business or design analysis of the website.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the notification systems of the prior art, whilst allowing communication, are explicitly connected to the given application which created the notification (such as the particular website) are not necessarily product or topic orientated. Applicants have also realized that social networks such as Facebook which provide feeds/actions for their subscribers, are unaware of the actual subject matter of the feeds/actions they are providing. Furthermore, as discussed in the hotel booking example herein above, the cards are provided synchronously as part of a notification from the main site in real time only.

Applicants have realized that the systems of the prior art may be improved by a system that can link users or visitors of a website belonging to a website building system (such as consumers, visitors etc.) with feeds and actions provided by multiple publishers or producers (such as websites, e-shops, blogs etc.) via a message card, i.e. a system that communicates via product centered cards (possibly including an underlying product definition or product instance reference) and understands the semantic hierarchy of the product that is presented in a user feed. The cards may be generated separately from the main site workflow and asynchronously (i.e. not when the user is working on the specific site).

The system may also be integrated with a website building system that has been used to construct a primary system such as an e-shop (as described in more detail herein below), or may be integrated with standalone visual design systems, external systems to the website building system or associated third party applications to the website building system and mobile applications devices.

It will be appreciated for the sake of the below mentioned discussion, the term product may apply to a consumer good (such as an item of clothing or a restaurant order), a service session (such as a hotel room order or a massage session), a topic of interest (such as hand gliding or stamp collecting) or a product in a non-consumer environment (such as a course, a meeting or an event which may not be paid for.)

The system may also be able to transfer these cards between users and transform them accordingly as required. The system may be able to use these cards with multiple displayable widgets (or views) and associated actions, which also may affect the card itself (e.g. act as a trigger for card creation or card change). This may include advanced techniques for automated or dynamic assignment of display widgets to cards. The message cards underlying such system shall be from here on known as actionable widget cards.

An example of this system is a set of e-commerce related primary applications hosted on one or more on-line website building system(s) i.e. a set of e-stores. A product card system (also known as interface application or interface system) may allow users such as site owners and site visitors to communicate and exchange the above mentioned actionable cards which implement e-commerce related actions and operations (such as a product purchase or delivery). Such cards may include underlying business objects (or products/items), visual widgets (or views) and associated actions as described in more detail herein below. The following discussion refers to a product card system, although the system is applicable to business objects in general and not just to products.

The product card system may allow the various users (which may include site designers, site owners and site visitors) to perform the actions included in the cards (such as ordering an offered product). The product card system may also support system operations on cards and system-level actions which are not specifically associated with the card itself, but are provided by the system for some or all cards. Such system operations may include, for example, transferring, transforming or matching of cards as described in more detail herein below.

Figure 1B:
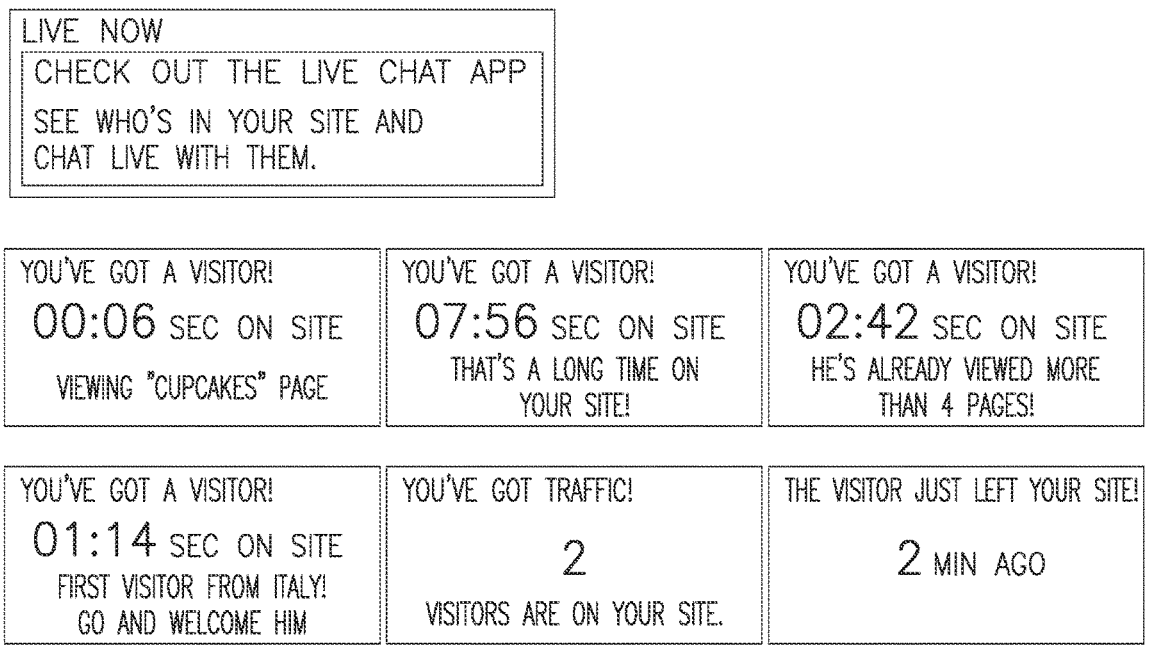
Figure 1C:
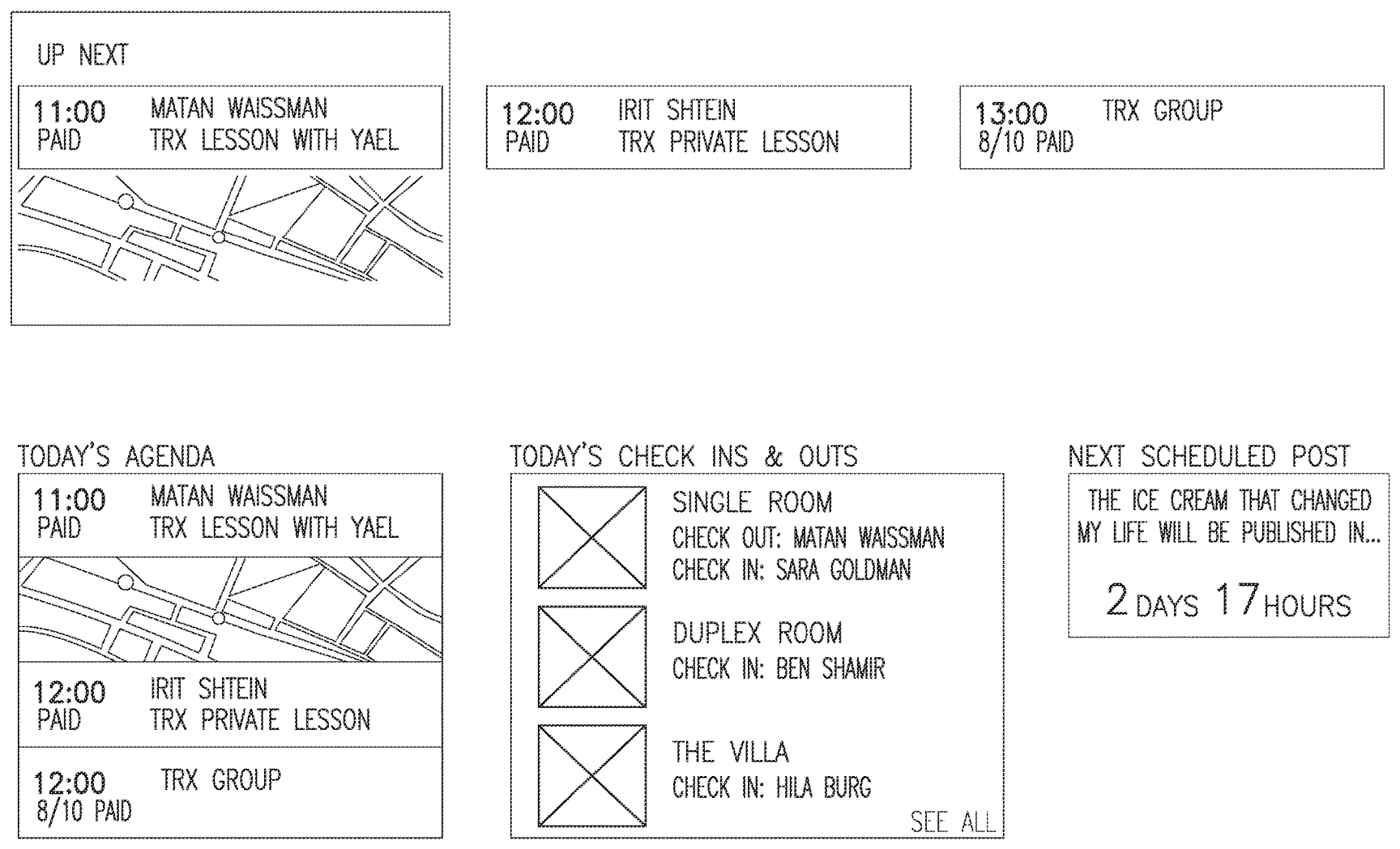
Figure 1D:
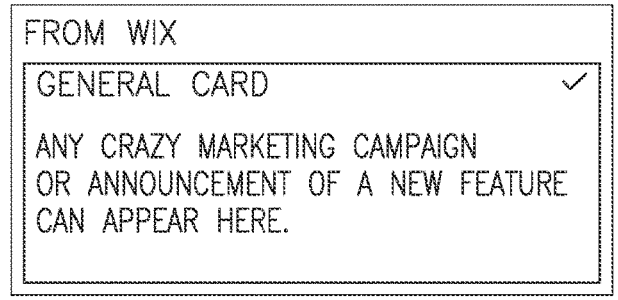
Figures 1, 1E:
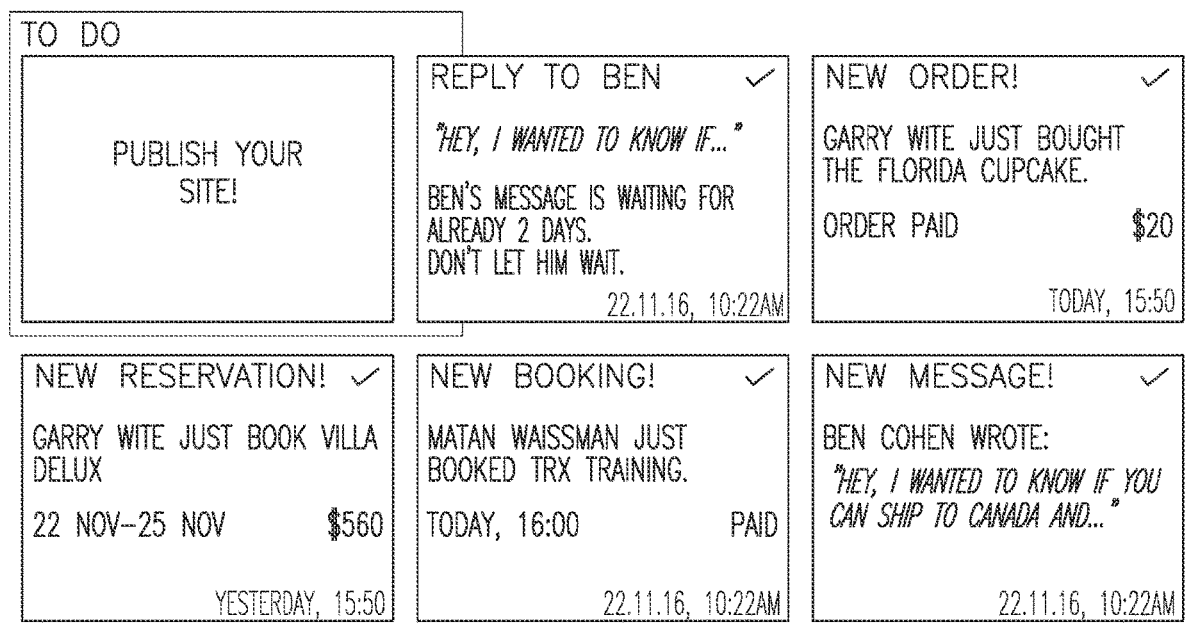
Figures 1, 1G, 2:
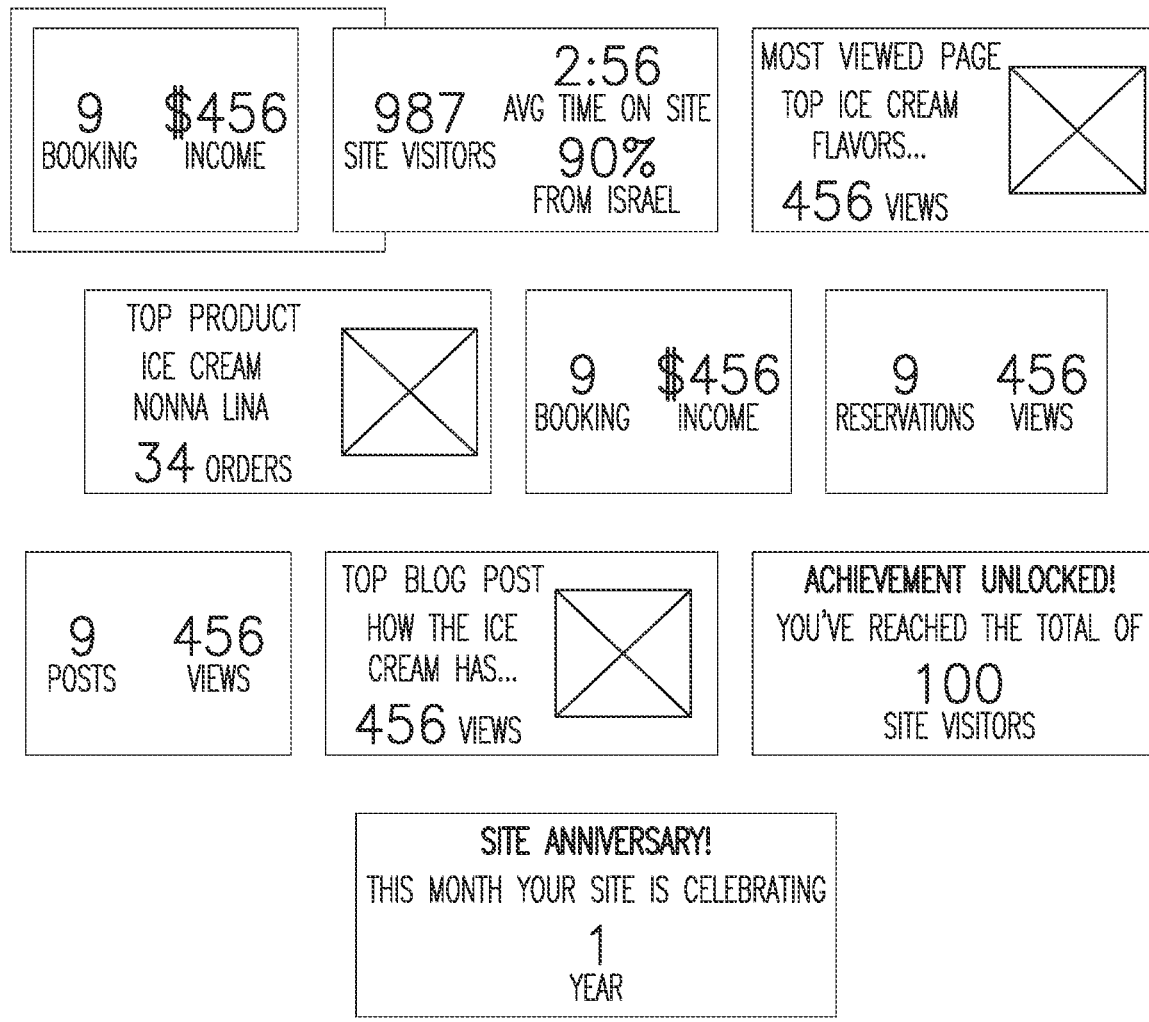
FIG. 2 is a schematic illustration of a system for the creation, use and communication of actionable widget cards; constructed and operative in accordance with the present invention.
Figure 1H:
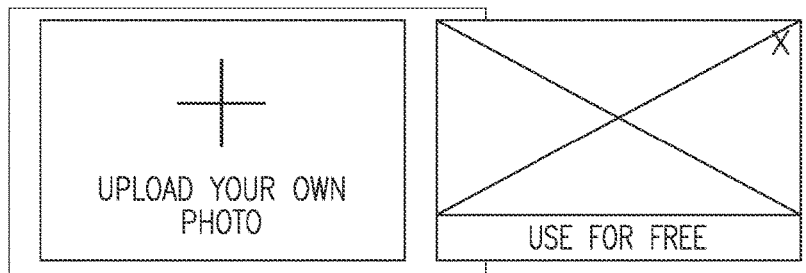
Figure 1I:
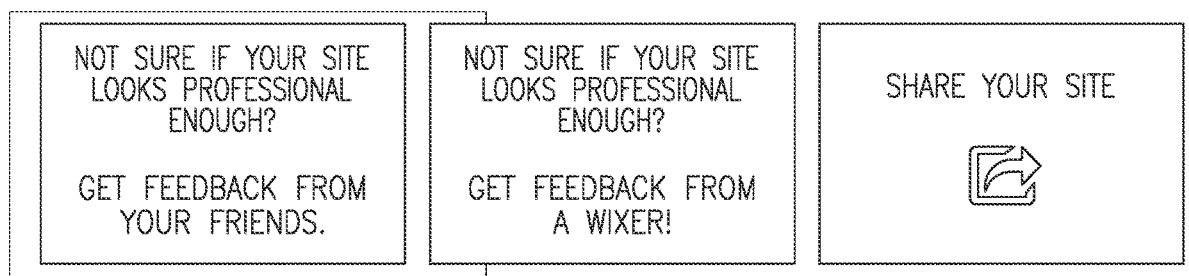
Figure 1J:
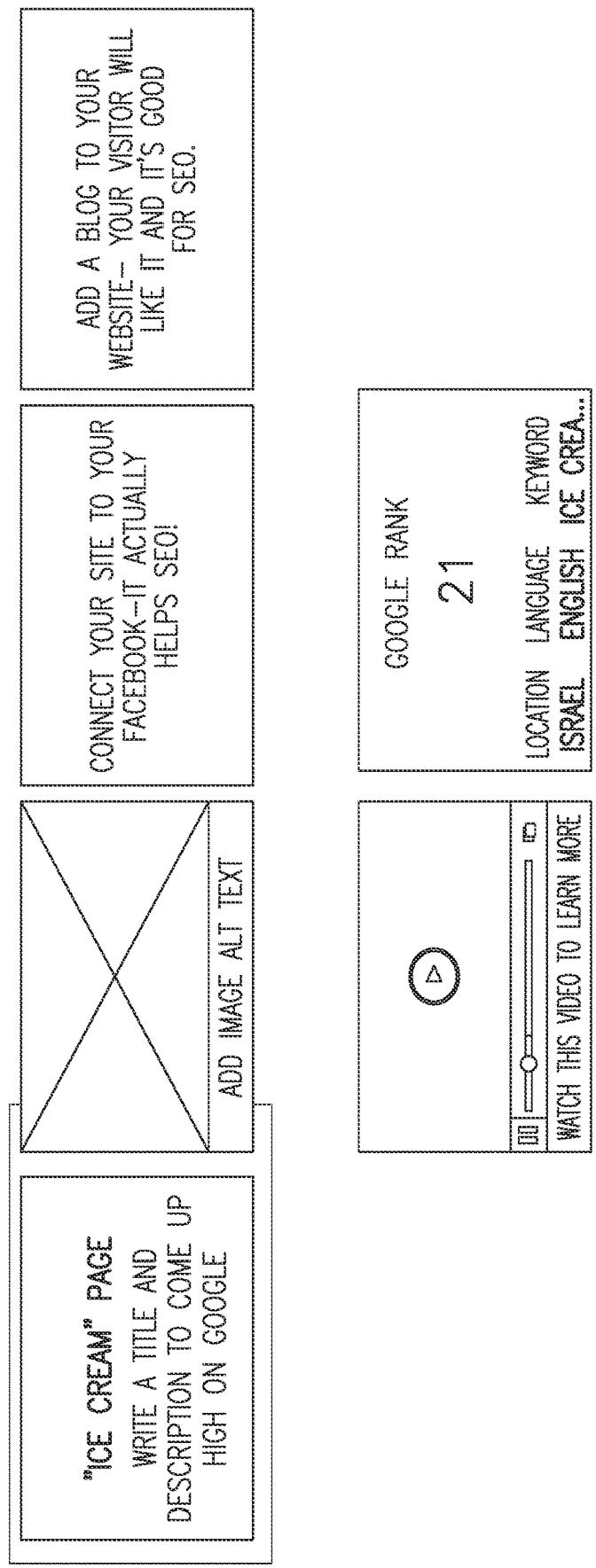
Figure 1K:
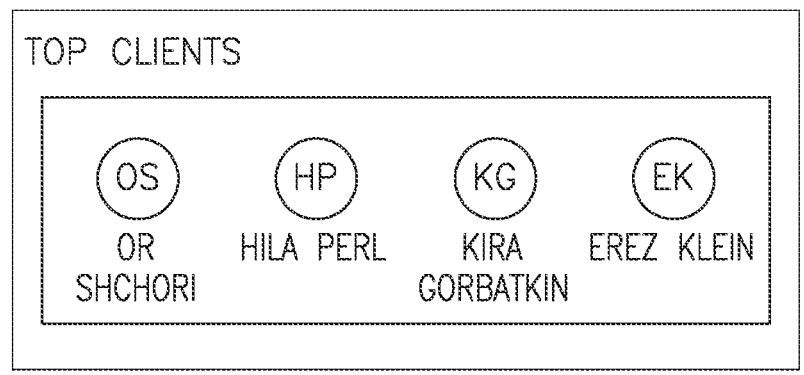
Figure 1L:
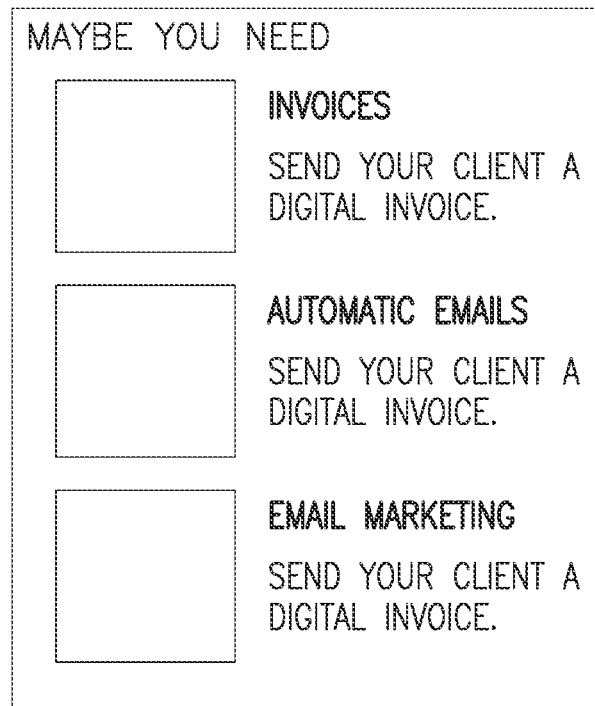
Figure 1M:
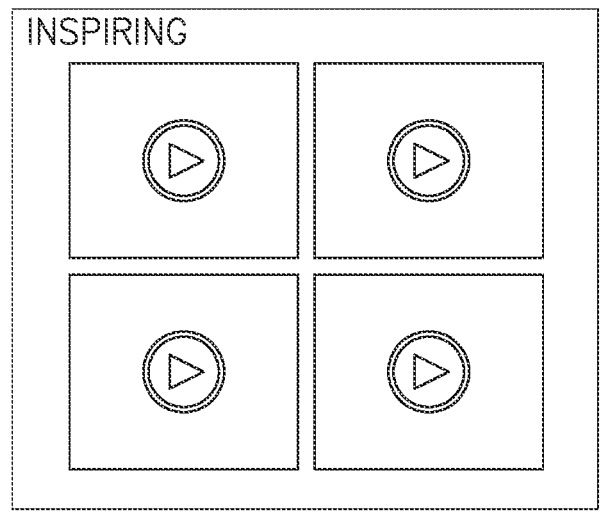
Figure 1N:
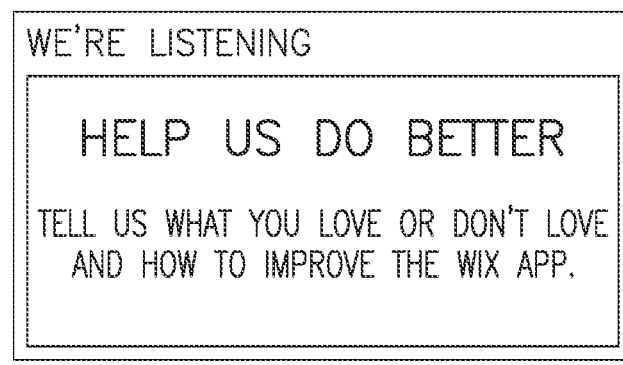
Figure 1O:
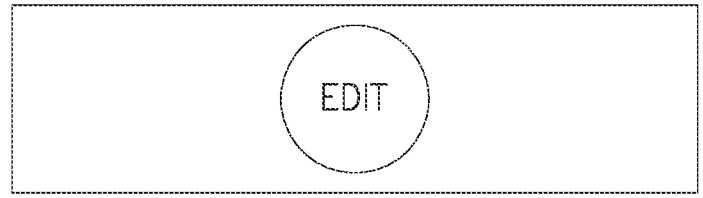
Figure 1P:
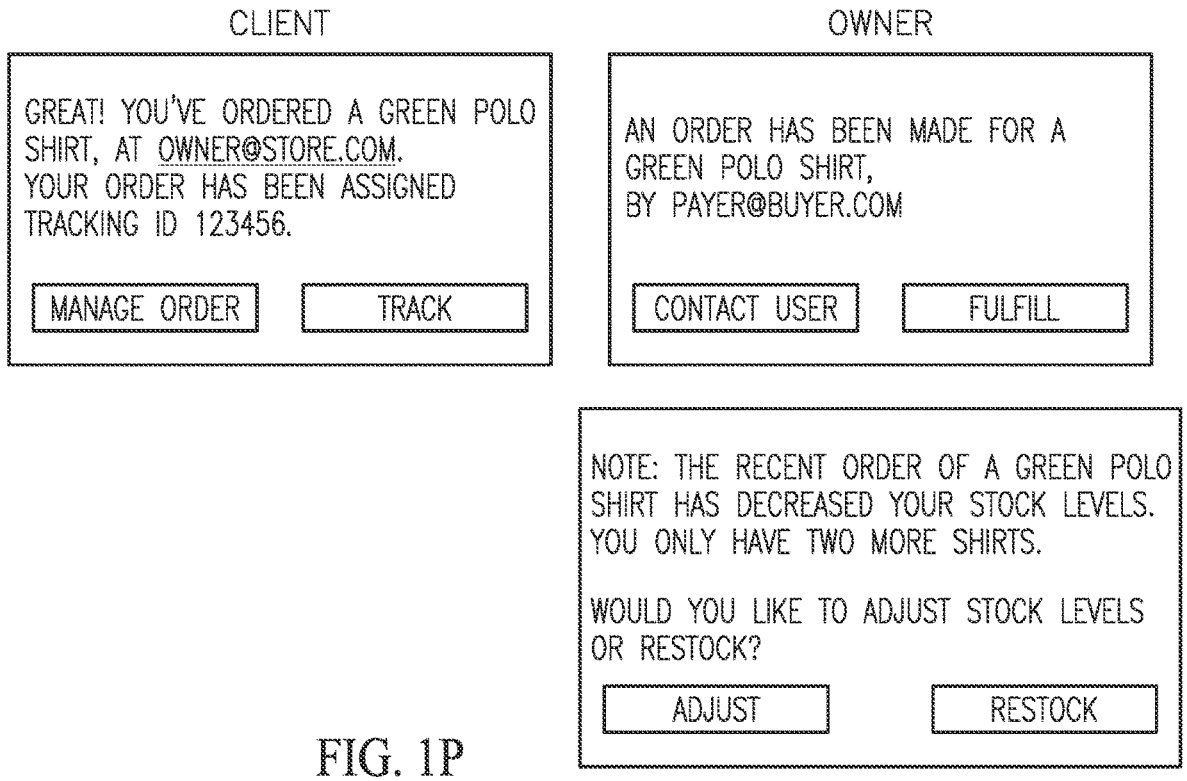
Figure 1Q:
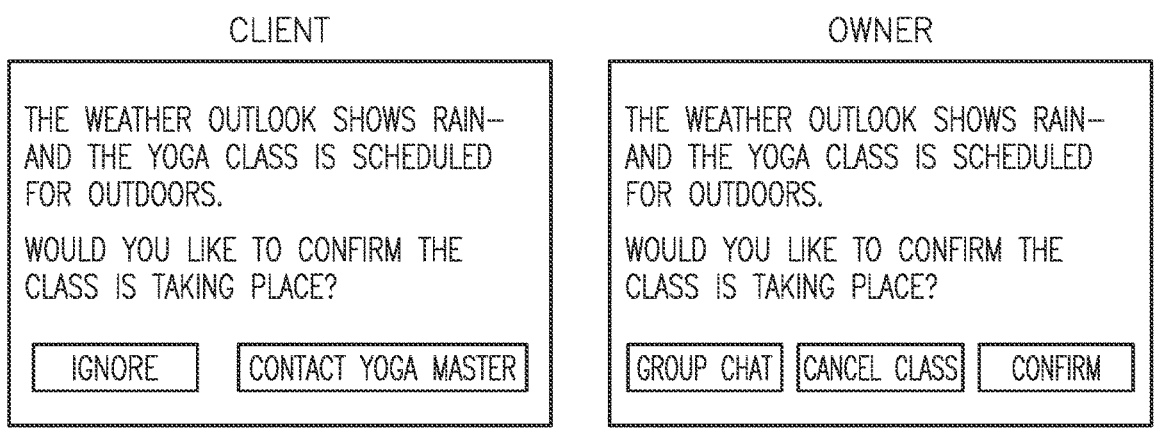
Figure 1R:
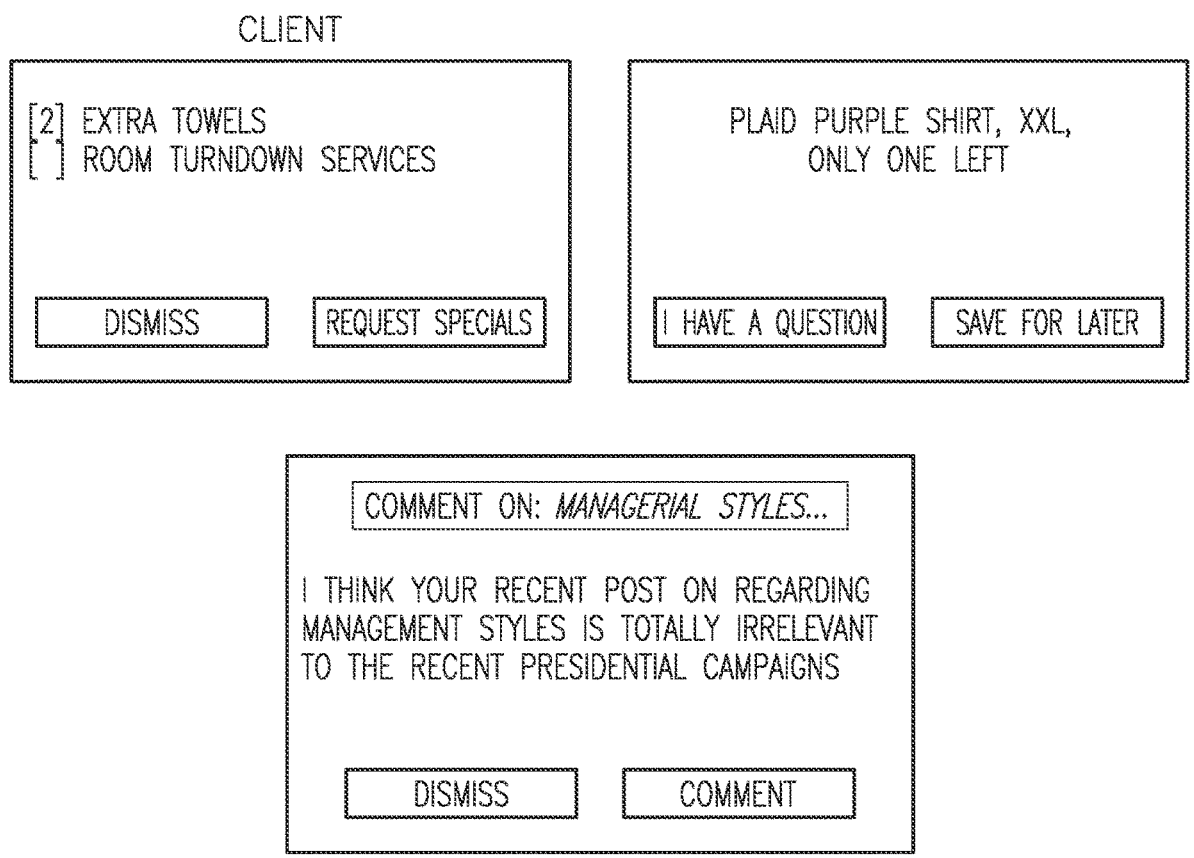
Figure 2:
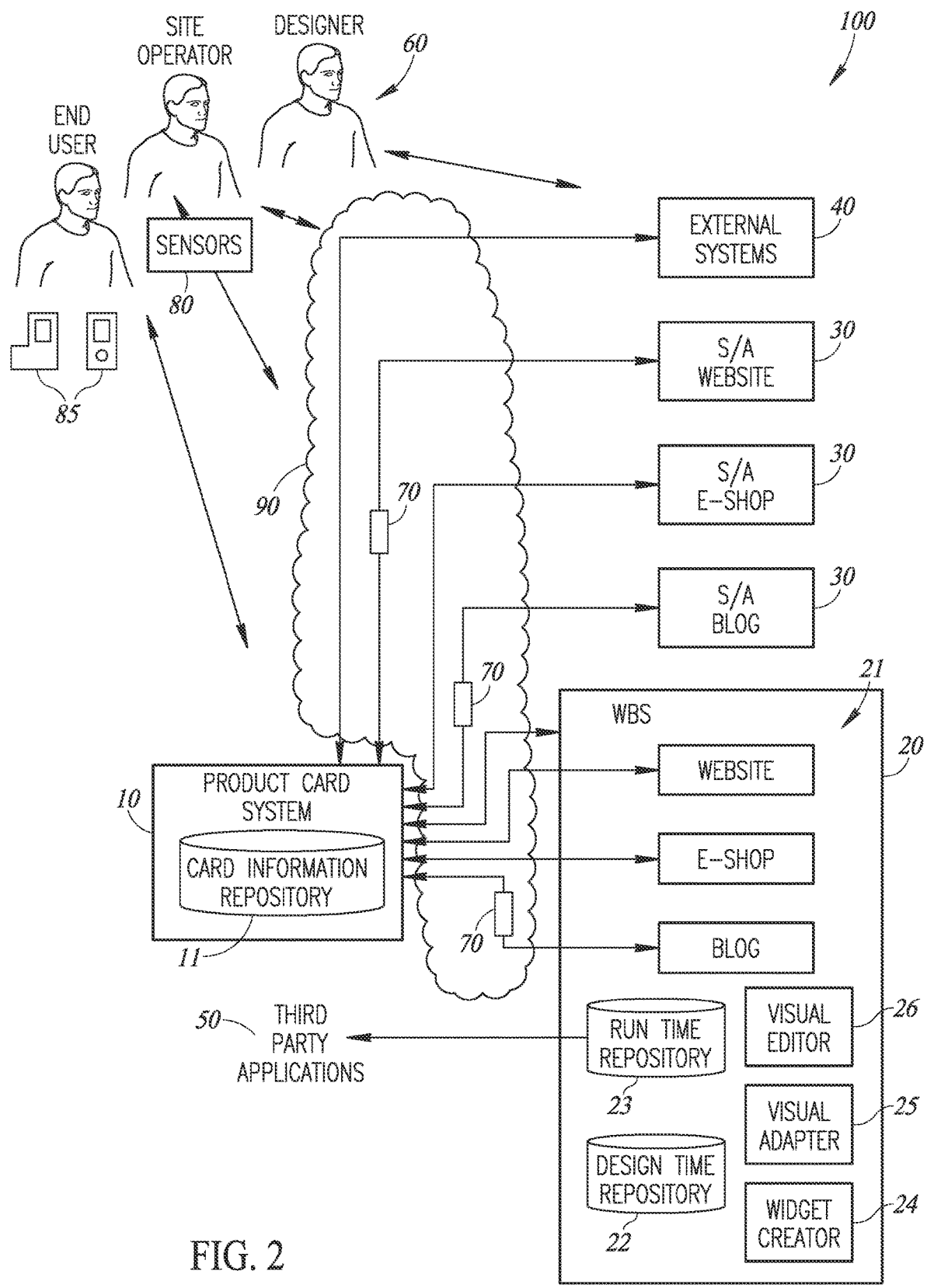

Reference is now made to FIGS. 1A to 1R which illustrate examples of such cards for different scenarios and described in more detail herein below.

Reference is now made to FIG. 2 which illustrates an exemplary system 100 for the creation, use and communication of actionable widget cards in accordance with an embodiment of the present invention. System 100 comprises a product card system 10, a website building system 20, standalone visual applications 30 (such as websites, e-shops and blogs), external systems 40 and third-party applications 50. All may be in communication with each other and users 60 via at least one actionable widget card 70. Users 60 may include desktop visitors, mobile site and application users, site owners or operators or a site designer (who interacts directly with the website building system). A user 60 may also be associated with a sensor 80 as described in more detail herein below.

It will be appreciated that system 100 may use a web-based architecture implemented on servers or a cloud-based platform, either of which may be accessible through communication media 90 (such as the Internet or local network). It will be further appreciated that product card system 10, a website building system 20, standalone visual applications 30 (such as websites, e-shops and blogs), external systems 40 and third-party applications 50 may all have client-side elements 85 as well, with their functionality divided between the server and the client elements. Furthermore, third-party applications 50 may have server elements running on website building system 20 and on separate hosting servers as well as on the user machines and mobile devices. Also, system 100 may use mobile apps, typically downloaded from an app store, to implement some or all of its functionality on the client side.

It will be appreciated that system 100 is typically associated with visual applications that implement e-commerce related third party applications 50 and components. Events may include e-commerce related events (buy a product etc.) and others (e-mail, fill registration form etc.). In an alternative embodiment (known as "site-less" configuration), product card system 10 may function in conjunction with a backend-only non-interactive external system 40, allowing the users to access the "primary system" through product card system 10 only.

Website building system 20 may further comprise visual applications 21 which may have been created within the realm of website building system 20 and a design-time repository 22 to hold information about visual applications 21 such as templates, component definitions, site/app definitions and editing history and a run-time repository 23 store including site/application operational data, collected business intelligence (BI), activities/messages and contacts etc. as described in more detail herein below. Website building system 20 may also comprise a widget creator 24, a visual adapter 25 and a visual editor 26. The functioning of these elements is described in more detail herein below It will be appreciated that the third-party applications 50 may be simple or complex and may be embedded into the sites and applications created by website building system 20. Third party applications 50 may be provided by actual third-party providers, or by the website building system 20 vendor himself.

It will also be appreciated that third party applications 50 may exchange information (with the pertinent website and with each other) using standardized structured messages (activities) as discussed in US Patent Publication No. 2015/0089354, entitled "System and Method for Third Party Application Activity Data Collection", published Mar. 26, 2015 and assigned to the common assignee of the present invention.

Figure 3:
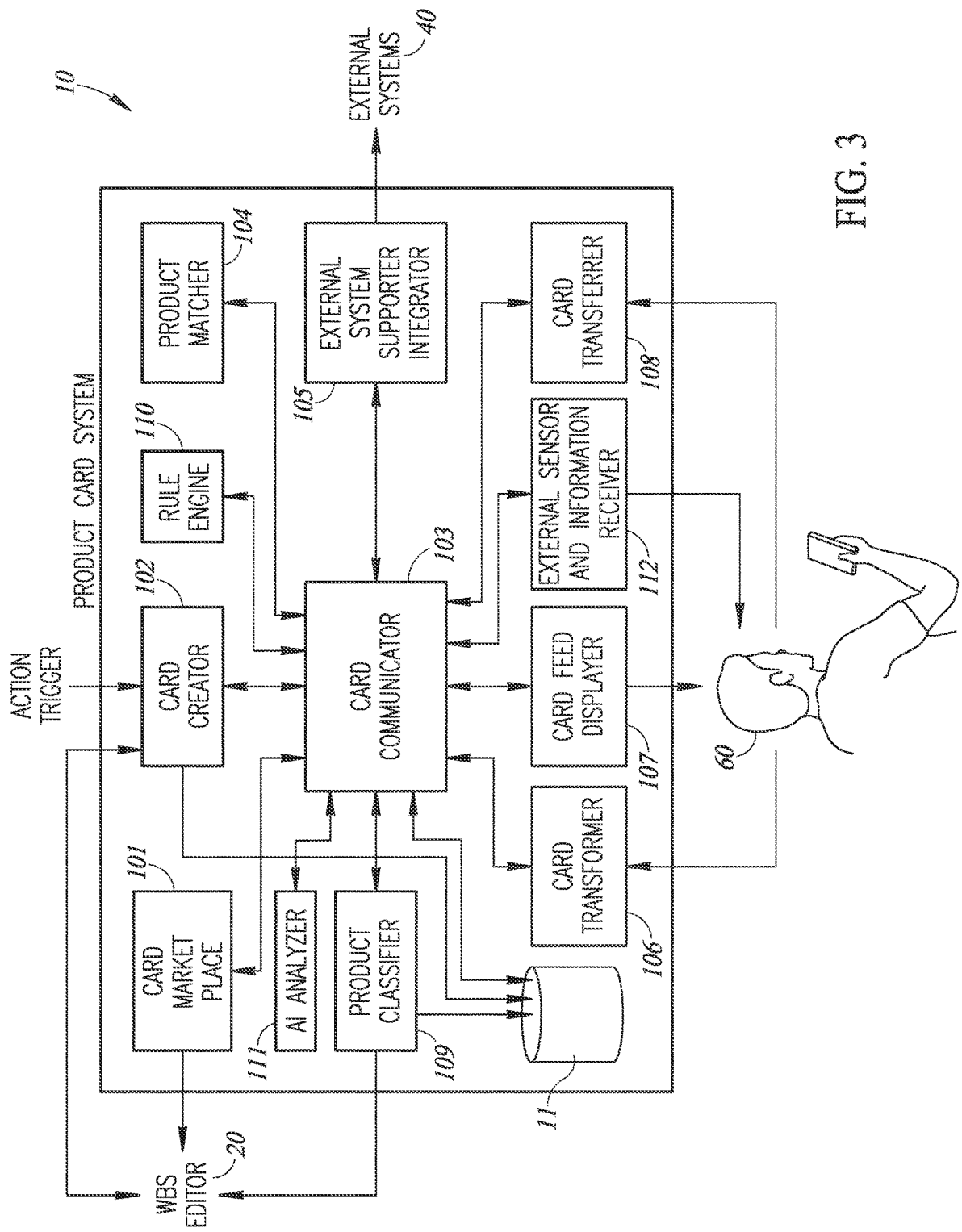
FIG. 3 is a schematic illustration of the elements of the product card system of FIG. 2; constructed and operative in accordance with the present invention.

Product card system 10 may facilitate the creation and communication and exchange of the above mentioned actionable messages or cards 70. Reference is now made to FIG. 3 which illustrates the elements of product card system 10.

Product card system 10 may comprise a card information repository 11, a card marketplace 101, a card creator 102, a card communicator 103, a product matcher 104, an external system supporter/integrator 105, a card transformer 106, a card feed displayer 107, a card transferrer 108, a product classifier 109, a rule engine 110, an AI (artificial intelligence) analyzer 111 and an external sensor and information receiver 112. The functionality of these elements is described in more detail herein below.

Card information repository 11 may store card 70 definitions and actual card instances as discussed in more detail herein below.

It will be further appreciated that in alternative embodiments, system 100 may also be applied to other applications such as non-e-commerce scenarios, such as blogs and blog creation systems and marketing and promotion systems which deliver e-mail or other notifications to users. System 100 may further be applied to organizational sites which implement workflow, form processing based on the integration of multiple third-party applications or with a system serving a vertical market such as a hotel system, a booking system (for appointments or classes), a restaurant system or video/media channel system etc.

In yet another embodiment, system 100 may also be implemented though a mobile device application, typically connected to a server which provides back end functionality. This could be done using a native mobile application, an interpreted one, a hybrid (combined native and web) application or using any other technology.

System 100 may also be used with "foreign" application platform technologies (website building system, mobile app or otherwise) which were not constructed to interact specifically with system 100. In this scenario, the integration may be achieved using a specialized plug-in or interface added to such foreign platform technology, at the application level (e.g. as provided by Facebook messenger) or at the system level (e.g. as provided by Apple's iOS).

Alternatively, system 100 may be used with multiple related (but not co-hosted) applications, e.g. multiple mobile apps using the same or separate servers.

System 100 may also be used with multiple unrelated applications, e.g. multiple separate websites or mobile apps which are connected using a plug-in or web service to provide the described system capabilities.

It will be appreciated that a primary application development system (e.g. an underlying website building system) may support the notions of "verticals", specific adaptations for specific vertical markets (such as photographers, wedding planners, bakeries etc.). Such adaptations may apply to website building system 20 itself, the provided templates (site/page etc.) and other resources. System 100 may support uniform use across multiple such vertical variants.

Product card system 10 may typically be implemented as a separate application (website or mobile application) connected to website building system 20 (server or client side). Website building system 20 and product card system 10 may typically share a common or related back-end system, but the integration between these two systems 20 and 10 may also be provided through communication between two separate back-end systems (with product card system 10 implemented using one or more separate servers).

Another possible embodiment is one in which product card system 10 is embedded into or otherwise integrated with website building system 20. This could be (for example) as a feature, a sub-system or running side by side with website building system 20.

System 100 may also combine both approaches, making product card system 10 functionality accessible (for example) both through the website and a separate application.

Product card system 10 may be accessed as a website (desktop or mobile), a mobile app or any other type of app (i.e. using a client element which is integrated or separate from client element 85). Product card system 10 may also be implemented using technology which allows on-demand application loading (such as Google's Android Instant Apps). Using such a technology allows cards 70 to operate (including feed/card viewing and card associated action execution) outside of product card system 10 without pre-installing the product card system 10 application.

System 100 may also use a product card system 10 version or multiple versions (e.g. serving different user classes) as discussed in more detail herein below.

It will be appreciated that the three repositories (card information repository 11, design-time repository 22 and run-time repository 23) may be integrated or synchronized through several mechanisms.

Under one embodiment, both product card system 10 and website building system 20 may use a joint data repository between them, so the two systems are using the same underlying data (i.e. that held in repositories 11, 22 and 23). In this scenario, the displayed resultant widget cards 70 represent the actual operational/business data used by website building system 20.

Under another embodiment, product card system 10 and website building system 20 may use separate repositories, and card information repository 11 may reflect the internal processes of website building system 20. Product card system 10 and website building system 20 may both implement an update/synchronization mechanism to update card information repository 11 with the relevant updates to website building system 20.

Card information repository 11 may contain additional data (in addition to the accessed/synchronized website building system 20 data relevant to the cards) and in particular, additional cards 70 which do not reflect website building system 20 data. Such cards may include (for example), cards 70 which reflect chat (or other) conversations between system users 60, and cards 70 which reflect added comments, notes and reviews (e.g. a hotel site operator posting a "give an upgrade to this guest on arrival" card, which would be displayed when the guest checks in).

It will be appreciated that such data may be managed by product card system 10, but may be updated in website building system 20 if required.

It will be further appreciated that the relationship between product card system 10 and website building system 20/standalone visual applications 30/external systems 40 may be many-to-many. For example, a single website building system 20 may have multiple product card system 10s connected to it (e.g. from multiple vendors), and a sole product card system 10 may contain cards reflecting activity in multiple website building systems 20/standalone visual applications 30/external systems 40. This is in addition to having multiple versions of the same sole product card system 10 as discussed in more detail herein below.

It will also be appreciated that cards 70 may be stand-alone and external to system 100. As discussed in more detail herein below, cards 70 may be sent or transferred via some form of communication (chat, e-mail, social network sharing) using cards 70 which are self-contained i.e. the transferred object may contain the relevant data as well as the code required to implement the card/widget functionality. In this scenario, card 70 may function on a target system not connected to the Internet (once it is received in that target system).

System 100 may also use cards 70 which interact with supporting systems (source system or others). In this scenario, the transferred object may function through reference to the underlying system providing the service or using a plug-in/third party application embedded in the external systems in which the cards operate.

The transfer of cards may also be within the same eco-system (environment) or a different eco system.

The discussion below focuses on a product card system 10 and a website building system 20, but is applicable (with the relevant changes) to other possible configurations as well.

As discussed herein above, system 100 may support multiple user 60 categories. The main categories are site owner (which typically owns and operates the e-commerce shops in the site) and site visitors (which interact with the sites). System 100 may support additional categories, such as site designer (which may be separate from the site owner), specific (limited) e-shop operators (which have specific operational privileges for an entire e-shop or for a specific section of the e-shop e.g. may only handle the books sections) and site support personnel (which may only handle support issues for an e-shop).

Other categories of users 60 may include multiple classes of site visitors, such as regular and VIP visitors, registered/unregistered/anonymous visitors or visitors subscribed to certain services like those following updates on a specific topic.

System 100 may provide separate interfaces (and a product card system 10 versions or instances) for each user 60 category (e.g. site owner and site visitors), or may provide a single interface/UI or app for some or all the user 60 categories. Some embodiments of system 100 may provide a product card system 10 just for specific user 60 categories and not for others (including, for example, branded version for specific web sites or web site collections).

It will be appreciated that user 60 may belong to multiple categories and thus the owner/visitor graph is not a standard bipartite graph. For example, website building system 20 may provide a mechanism whereby a specific merchant is the site owner of his own e-store, but is a customer (and site visitor) on multiple wholesale sites which provide the goods being sold in the merchant's e-store. In another example, a designer may be classified as a "site designer user" in multiple sites (operated by the designer's clients), and as a site owner of the design studio website.

The (typical) use of a sole product card system 10 for both types of users 60 is important, as it allows (for example) a merchant to use a single integrated feed and notification system for updates originating with both clients and suppliers.

Figure 4A:
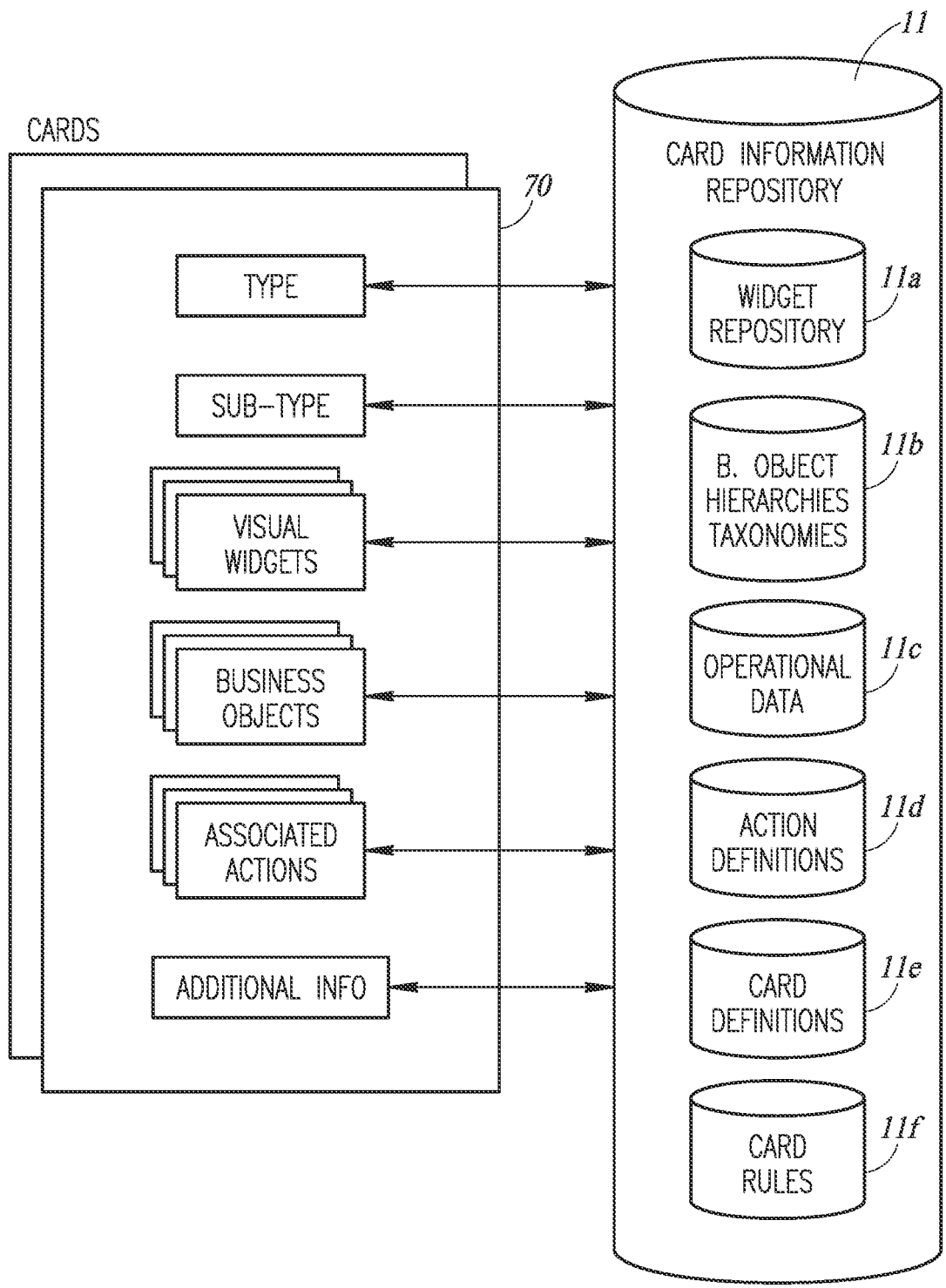
FIGS. 4A and 4B are schematic illustrations of the structure and elements of a typical actionable widget card; constructed and operative in accordance with the present invention.

As discussed herein above, actionable widget cards 70 provide a visual interface to activities performed by website building system 20 and its hosted websites (such as the standardized messages described in the US Patent Publication No. 2015/0089354). Cards 70 typically describe events or actions associated with a specific product or business object, e.g. "I would like to buy this yellow T-shirt (product ID XYZ)". Each card may include 3 main elements (which may either not appear at all or may appear multiple times). The 3 main elements may be underlying business objects, associated actions and operations related to the object or objects and visual display widgets as is illustrated in FIG. 4A to which reference is now made. FIG. 4A illustrates a typical actionable widget card 70 and the related card information repository 11 data (as described in more detail herein below).

Card 70 may also comprise information regarding the type, sub-type, visual display, pertinent business object, associated actions and other additional information as described in more detail herein below.

It will be appreciated that cards 70 may be partial, i.e. may not include all the above-mentioned elements. A card 70 may be considered a product card (i.e. containing product/business object information) or a non-product card 70. An example of a non-product card with no type, widget (view) or business object may be a system message regarding a system upgrade.

Figure 4B:
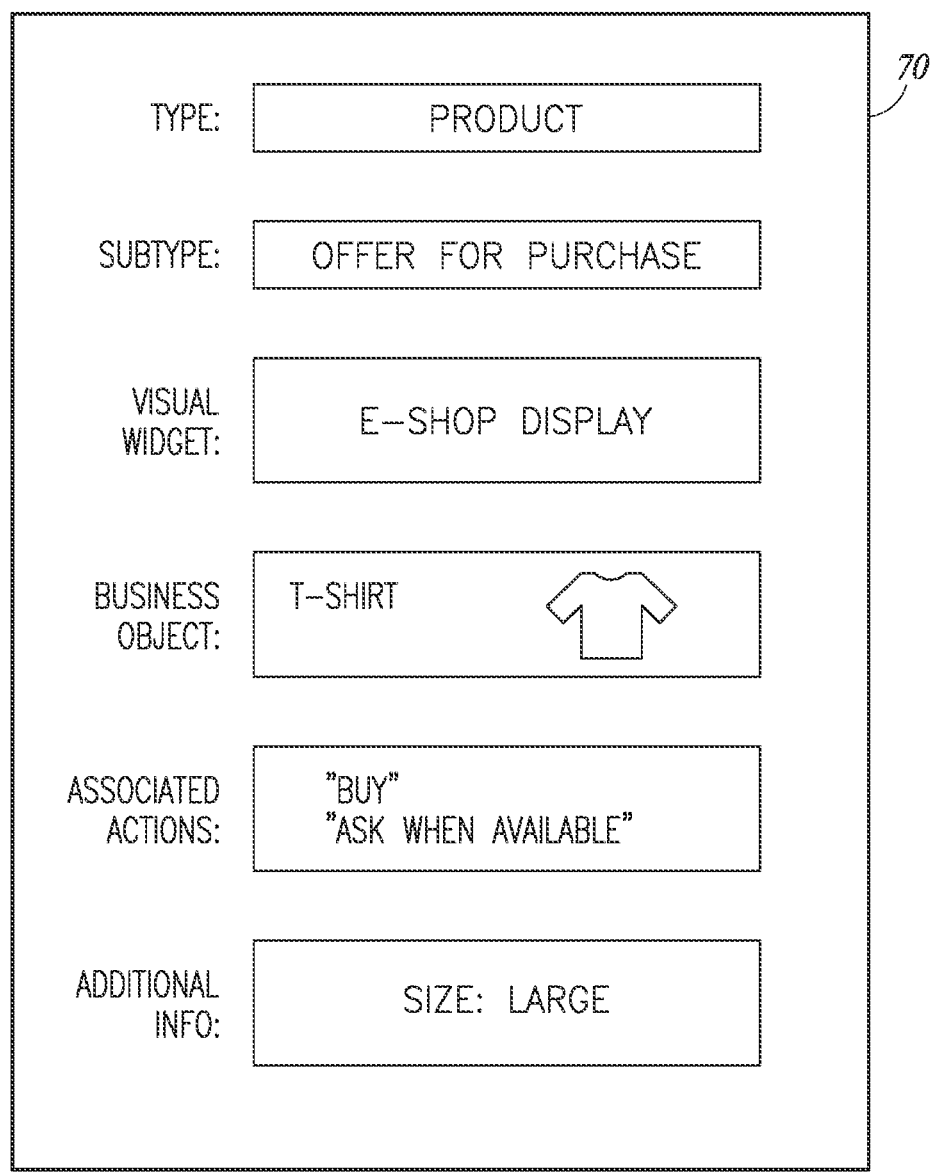

It will be appreciated that an example of an underlying business object is the above mentioned yellow t-shirt as is illustrated in FIG. 4B to which reference is now made. It will be appreciated that some card types and sub-types (such as chat cards) do not have an underlying business object as discussed in more detail herein below. Thus, for the example of FIG. 4B, the type is "product", the subtype is "Offer for Purchase", the visual widget is "e-shop display", the business object is "yellow t-shirt (product ID XYZ)", the associated actions are "buy"/"ask when available", and additional info is "Size: Large".

It will also be appreciated that cards 70 may have associated actions which are predefined and stored in repository 11.

It will be further appreciated that product card system 10 may dynamically match widgets/views to the underlying business objects in cards 70 which do not have a pre-associated visual widget as discussed in more detail herein below. Cards 70 may have multiple associated displayable widgets and multiple layouts/multiple widgets for presentation on multiple platforms or multiple display configurations (e.g. screen sizes).

Cards 70 may also include additional attributes and parameters as further described herein below.

It will be appreciated that cards 70 are a "common currency" used by multiple system 100 elements and typically convey e-shop item information. However, cards 70 are distinct from the e-shop items. E-shop items are not cards, but they generate cards 70 when specific operations are performed on them (e.g. "send this item", "buy this item" or "ask if this item is in stock").

Cards 70 may appear in website building system 20, e.g. when product card system 10 is integrated with website building system 20 as described herein above.

It will also be appreciated that card 70 may also be interactive, i.e. function as a mini-application. For example, a restaurant sends a payment card and the diner changes the tip amount on the card.

As discussed herein above (and illustrated in FIG. 4A), card 70 definitions and actual card instances are stored in one or more card information repositories 11. Card information repository 11 may further comprise a widget/view repository 11a to store widget definitions, business object hierarchies and taxonomies, a repository 11b to store business object definitions, an operational data repository 11c, an action definitions repository 11d, a card definitions repository 11e and a card rule repository 11f. These repositories 11 may be integrated with website building system 20 or may be separate as required as described herein above. The use of these repositories is discussed in more detail herein below.

It will be appreciated that system 100 may support multiple card 70 types, and multiple possible card sub-types for each type, as shown in the example cards included in FIGS. 1A to 1R back to which reference is now made. System 100 may support additional card types and sub-types as described in more detail herein below.

It will also be appreciated that cards 70 may be used for multiple purposes including product cards (such as the yellow t shirt example), general cards (e.g. "please upload pictures") and marketing cards, such as a campaign announcement from the site owner. Such a card 70 may also include a registration option or form, or a pointer to a specific entry point (or landing page) of website building system 20. Such cards 70 may be displayed (for example) through banner ads.

Other uses of cards 70 are notifications (such as "out of stock"), chat message cards and business insights cards, such as a card 70 noting that a specific product has been generating interest lately by customers but has low purchase conversion rate and recommending the owner to place a discount on the product.

Reference is now made back to FIGS. 1A-1R which illustrate numerous site-related notifications represented by cards 70 based on analysis of a site (created by website building system 20 or a standalone site 30) and its use.

FIG. 1A illustrates cards 70 displaying general site information and business analytics.

FIG. 1B illustrates cards 70 displaying live system information related to current site activity.

FIG. 1C illustrates cards 70 displaying scheduling and agenda information (such as for sites which involve sessions or booking elements). Such cards 70 may also be useful for users 60 (site owners and visitors), displaying their calendar information and upcoming appointments or sessions.

FIG. 1D illustrates a card 70 displaying a marketing campaign (e.g. one initiated by the system/website building system vendor).

FIG. 1E illustrates cards 70 displaying operational activities to be performed by the site owner or operator.

FIG. 1F illustrates cards 70 displaying suggestions to perform changes to the website, such as adding a Christmas sale, changing some items, creating a blog post etc. These could also involve site design tasks.

FIG. 1G illustrates cards 70 displaying periodical (such as monthly) statistics about the site or business.

FIG. 1H illustrates cards 70 related to image uploading activities.

FIG. 1I illustrates cards 70 related to publishing the site or getting feedback about it.

FIG. 1J illustrates cards 70 related to improving the site's SEO and getting information about the site's search engine ranking.

FIG. 1K illustrates a card 70 displaying information about the site's top clients.

FIG. 1L illustrates a card 70 displaying information about (and possibly linking to) additional applications and capabilities offered by the system.

FIG. 1M illustrates a card 70 displaying ideas for inspiration to the site owner (e.g. through videos).

FIG. 1N illustrates a card 70 requesting feedback for the system developers.

FIG. 1O illustrates a card 70 redirecting the site owner to the site editor.

FIG. 1P illustrates side/owner side cards 70 handling ordering and restocking suggestions/requests.

FIG. 1Q illustrates client side/owner side cards 70 handling system suggestions for event (e.g. yoga session) modification and rescheduling.

FIG. 1R illustrates cards 70 handling domain-specific issues (hotel amenities, e-shop product reminder/question, system blog post notes).

It will be appreciated that some of the cards 70 above may include multiple views/widgets (e.g. one for site owner and one for the site visitor), such as order card 70 (FIG. 1P), booking/session card 70 (FIG. 1C) or an event modification card 70 (FIG. 1Q). Some cards 70 may also be used (with different meaning/semantics) for both system vendor to site owner communication and for site owner to site visitor communication (such as the marketing campaign card in FIG. 1D).

It will be appreciated that in a typical embodiment, product card system 10 may define the card types and sub-types. The types and sub-types typically correspond to the standard third-party application messages (as described in US Patent Publication No. 2015/0089354) and additional primary system events.

It will be appreciated that in typical embodiments, the underlying logic and visual elements which provide the functionality of card 70 are executed on product card system 10 server and/or dynamically loaded to the product card system 10 client. Thus, if card types or sub-types are added or modified, product card system 10 may support new or modified cards 70 without requiring a modified version of the product card system 10 to be installed (e.g. in the scenario that the product card system 10 client-side element is implemented as a mobile application).

System 100 may allow third party application providers or vertical application providers to create additional card sub-types (or possibly even top-level types) representing events and actions internal to their third-party application or vertical application. Such types and sub-types may be unique to a specific such provider, or standardized so to serve multiple such providers.

For example, the provider of a vertical application for video storage/processing/viewing may define specialized card types which relate to the video quantity stored, progress of off-line video transcoding and video playback BI (e.g. what percentage of visitors watch given videos until their end).

Such a vertical application may be used by multiple site owners for different purposes such as a fashion show's video catalog and an on-line university.

System 100 may further allow site owners or designers to create additional card sub-types (or possibly even top-level types). As described in more detail herein below, such card types may often be created through inheritance of existing cards or card templates. For example, system 100 may allow (e.g. as a premium feature) an e-commerce site owner to create branded custom order cards 70 which would stand out in the visitor's feed. Card types and subtypes may be stored in card definitions repository 11e.

System 100 may also allow an existing card sub-type to be visually customized (rather than creating a completely new card sub-type). This may be done by card creator 102 modifying the view widget associated with the card as discussed in more detail here in below. The new sub-type may be regarded as inheriting from the existing sub-type.

System 100 may further allow additional third parties (that are not necessarily vendors of third party applications 50 on the website building system 20 platform) to create additional card types via standardized API or plug-in mechanisms. An example of this is an additional third party performing business intelligence and suggesting actions via cards 70.

It will be appreciated that a business object can be a generic object/class (e.g. a hotel room of a given size) or a specific object instance (specific hotel room on a specific date) at varying levels of generality. Examples of business objects include a solitary product in an e-commerce shop, an actual product in the store or a description of a desired product (which may not fit any specific product) and a room in a hotel business which could be a room in general, a specific room category (e.g. a king-size bed mini-suite), a specific room in the hotel or a specific night's stay in a specific room. In general, a business object is more a generalized or abstract form of a product. A product typically refers to a specific purchasable good or service, even if not fully specified, e.g. a hotel room which was purchased but does not have a concrete room number assignment yet. A business object is more abstract, and can refer to hotel rooms in general, or even to a number of possible product classification (e.g. a number in a sub-tree of the product taxonomy hierarchy).

Business objects may also include a dish in a restaurant. a table in a restaurant, a music album, a picture album, a single therapy session for a therapist, a specific flight ticket on a specific flight, a blog post, a page in website building system 20, or a link to such a page, a scheduled event (such as an event defined by the Facebook social network or using the iCalendar file standard), a contact business card (similar to the vCard file standard), a specific communication from a contact (like message) or an order or invoice document, possibly digitally signed.

It will be appreciated that system 100 may understand the underlying business object, i.e. system 100 may have a clear classification and information regarding the product. For example, a chat card 70 may contain an initial description or other representation of a business object which may not yet be understood by system 100 (e.g. "Hi—see the attached picture of a great shirt I saw at the show in the park last night, do you have it in black?"). However, product classifier 109 may convert this to a structured product description as early as possible (e.g. through analysis of the user's text and/or attached media) or later when the e-shop owner provides a specific response (which may include actual product's ID or attributes) as described in more detail herein below.

Product card system 10 may freely mix cards 70 describing business objects at different level of generality, even from the same site. For example, a query for possible room options made through product card system 10 may generate multiple cards 70 (e.g. room options) at various levels of specificity.

System 100 may also implement cards which do not reference a specific product, e.g. a filled contact form or a text/media message.

System 100 may also support cards 70 which contain multiple products (e.g. the content of a shopping cart) as well as a product with configuration information (such as a pizza order with multiple toppings definitions or a car rental order with extra options).

It will also be appreciated that the number and composition of business objects in a single card may change over time. For example, system 100 may implement a conversational chat card that represents an entire chat session.

Such a session may start with a site visitor asking the owner what t-shirts he recommends (0 business objects at this point). The owner responds with 3 new t-shirt models (3 business objects at this point). The visitor continues to discuss a specific model (1 business object at this point).

Such a change may be regarded as a card 70 transformation (transforming a chat card into an order card) as described in more detail herein below.

The following discussion focuses on products to be purchased as example of business objects, though business objects may cover services and additional object categories discussed herein above.

It will also be appreciated that the business object(s) referenced in a card 70 typically include a specific product ID associated with a specific product by a specific vendor (such as the yellow t shirt example). However, product card system 10 may transform a card 70 from a given product to other products (identical or alternate) by different vendors. Such alternate product may have (for example) a different vendor, color, size, model or configuration.

System 100 may also use cards 70 based on a generalized (non-vendor-specific) description of a product based on a set of attributes. For example, a shirt may be described as a "Size 45 man's bright yellow cotton short-sleeved t-shirt".

System 100 may also use standardized product definitions and classifications for the products/business objects (e.g. business object classification hierarchies). This standardization may allow matching products between different e-shop sites and may also make product cards 70 transferable (e.g. from one e-shop to another) and transformable (e.g. converting a card 70 describing a shirt from one vendor to a parallel card 70 describing a similar but different product.)

System 100 may use standard product taxonomies such as the United Nations Standard Products and Services Code (UNSPSC) or the GS1 Global Product Classification (GPC). System 100 may also use private commercial taxonomies such as the Google product taxonomy.

It will be appreciated that users 60 (including both site owners and site visitors) may perform multiple operations/actions on cards 70. Such operations may affect products or other business objects referenced by the cards. Such operations may include (for example) purchasing and restocking (as is illustrated in the example cards of FIG. 1P), opening details (for a product or other information provided by the card) and performing a product-specific "like". This may be a system-provided "like" functionality and not the one provided by a social network (such as Facebook). It may be specialized for system 100, for example including multiple "like" categories which embed product review functionality (e.g. "excellent product", "tried it and liked it", . . . ).

Users 60 may also use cards 70 to initiate a chat, for example from a site owner to/from a site visitor, or other users (as is illustrated in FIG. 1Q) and to perform recommended tasks for cards 70 such as operational tasks (as is illustrated in FIG. 1E), site content/design tasks (as is illustrated in FIG. 1F) and SEO tasks (as is illustrated in FIG. 1J).

Users 60 may also use cards 70 to share, i.e. to embed the card in a different place (i.e. outside of the feed in which the card is typically viewed). Such a different place may be internal to system 100 (e.g. embed this card in a chat conversation managed by system 100 with another user) or external to system 100 via an adapter (e.g. sharing this card on Facebook).

Associated actions may also be available depending on the category of user 60, selected from action definition repository 11d. For example, an item order card 70 may appear in both the store owner's and the buyer's feed. However, the actions available to each of these users 60 may be different (e.g. the store owner has a "supply" or "propose alternate product" action which is not available to the buyer).

It will be appreciated that when a specific card type is defined (e.g. by the system 100 provider or by a third-party application provider as described in more detail herein below), card 70 may inherit a set of possible pre-defined actions associated with the card type and sub-type (template actions). Product card system 10 may select which actions to allow, and may provide pre-defined parameters for some of the actions as described in more detail herein below.

It will be appreciated that there may be one or more widgets associated with card 70, which are used to display the content of card 70 in various situations. It will be appreciated that if no visual widget is pre-associated with card 70, product card system 10 may associate a widget at a later stage (or construct a new widget or modify an existing widget as detailed herein).

It will be appreciated that system 100 may use different widgets (for example) for the same card 70 when displaying the card 70 to different user categories. For example, a site owner may view a detailed version of a card 70 representing a product order (including additional information related to order fulfillment and current product stock situation and locations). A site visitor viewing the same order card 70 may be shown a more limited view. Furthermore, system 100 may present card 70 using a basic view widget, and allow user 60 to invoke an advanced, more detail widget for the same card 70 using (for example) a "read more" button.

Furthermore, the widget displayed to represent card 70 may change over time, even for the same user 60. For example, an e-shop may allow an order to be canceled for a certain period of time after ordering and before shipping. This could be (for example) due to a legal requirement, or done as part of the e-shop service to the site visitor. Instead of using a scheme such as graying-out a "cancel order" button, the e-shop may desire to use two "pending order" card 70 formats, one which includes the "cancel order" button (and any related part of the UI) and one which doesn't. As another example, a card 70 showcasing a pending order which the owner needs to satisfy may change colors or shape as more time passes to alert the owner regarding the urgency of delayed orders.

System 100 may support widget definition by multiple classes of users 60, including internal system vendor staff, third party application providers, vertical application providers and site owners. System 100 may provide different levels of design capability and functionality to different user classes.

System 100 may also provide a number of methods through which visual widgets may be defined (discussed in more detail herein below in relation to widget creator 24), including the following or a combination thereof. System 100 may provide a visual definition language (a standard one such as HTML, or using a specialized language) or a (possibly scaled down) version of visual editor 26.

Visual widgets may be defined in conjunction with the definition of site pages integrating website building system 20 or based on inheritance and modification of existing widgets.

The definition of the widget may also include the binding between the widget's displayed fields and the underlying information in the system's repositories, the conditions under which it appears (e.g. for cards with multiple viewing widgets which appear under different conditions, when transferred or transformed etc.) and any definition of dynamic layout anchors and relationship between the view components (as described US Patent Publication No. 2013-0219263 entitled "Web Site Design System Integrating Dynamic Layout and Dynamic Content", published Aug. 22, 2013 now issued as U.S. Pat. No. 10,185,703 granted Jan. 22, 2019 and assigned to the common assignee of the present invention).

The definition may also include any additional insights (e.g. user tips and instructions) which may appear in the card.

As discussed in more detail herein below, system 100 may use the methods above (e.g. using dynamic matching and adaptation) to match views/widgets to card information even if the user didn't predefine a widget for the card.

For example, an order card 70 may be useable with multiple types of products having different sets of properties and information. Thus, system 100 may allow the site owner to omit defining the exact view to be used for each widget in an "order" card, as system 100 may dynamically match and adapt views to different products included in such "order" card.

It will be appreciated that the widgets are not required to have an identical or common size. System 100 may support multiple cards (and visual widgets) using a number of possible card sizes.

It will also be appreciated that system 100 may support dynamic cards 70 which may be associated with front-end/back-end mini-apps, possibly used for analytics or other purposes.

Such cards may be dynamically updated, displaying content which changes over time as discussed in more detail herein below. Examples may include:

"A visitor has arrived at your site" card which includes a visitor name (if registered), the specific visited page(s) on the site and staying time, which is continuously updated (as is illustrated in FIG. 1B).

A card 70 which displays the top selling 5 products in terms of quantity or total revenue, or other business analytics results (as is illustrated in FIG. 1G).

A card 70 which displays information regarding user activity. Examples may include a blog system displaying a card 70 such as "There are 5 new comments on the blog" (for new comments on the entire blog, this may be sent to the blog owner) or "There are 5 new comments for blog post XYZ" (which may be sent to the post author, possibly different from the blog owner).

Such cards 70 may reflect the result of system business analytics or other analyses performed on site traffic and activity.

Such a card 70 may also be provided by a third-party application vendor, and in such a case may connect to a back-end application provided by the third-party application vendor as well.

It will be appreciated that the use of such cards 70 may save on producing numerous cards 70 (which would clutter the feed). A single card 70 may provide a display of the up-to-date information, and could pop to the top of the feed when a significant event occurred (e.g. the top selling product has changed).

It will also be appreciated that system 100 (and cards 70) may have parameters which control their functionality. Such parameters may be specified (for example) at the website level or in real-time by users 60 (including both site owners and site visitors).

For example, a site may specify parameters for its business analytics (e.g. provide top sales analysis card every X days). The site owner may override these parameters, and some or all users of the site may specify parameters for specific cards 70 or for system 100 in general (e.g. card feed filtering and sorting criteria).

These system parameters may further depend on the specific site page or page component(s) being viewed, i.e. a site page or component can request or set parameters for product card system 10.

When product card system 10 is integrated (e.g. as a side window) with website building system 20, a specific page may request or affect the display of cards 70 while a site visitor is viewing the page. It could also be implemented through 1-way or 2-way communication between the displayed primary web site (e.g. displayed on a mobile browser) and an instance of product card system 10 implemented as a mobile application on the same mobile device.

Thus, for example, when user 60 visits a specific e-shop, product card system 10 may highlight (e.g. through filtering, prioritizing or visual attribute modifications as described in more detail herein in below) cards 70 which relate to the specific e-shop, specific visited page or products related to the page. If (for example) a visitor is viewing a fishing rod product page, product card system 10 may highlight cards (currently in the user feed) which refer to fishing-related or otherwise complementary products.

Reference is now made back to FIG. 3 which illustrates the sub elements of product card system 10. As discussed herein above, product card system 10 may comprise repository 11, card marketplace 101, card creator 102, card communicator 103, product matcher 104, external system supporter/integrator 105, card transformer 106, feed displayer 107, card transferrer 108, product classifier 109, rule engine 110, AI (artificial intelligence) analyzer 111 and external sensor and information receiver 112.

Card information repository 11 may store pre-defined card definitions (in repository 11*e*), visual widgets and views definitions (in repository 11*a*), actions type definitions (in repository 11*d*), general business objects information/hierarchy (in repository 11*b*), generated cards (including visual widgets, underlying business objects, associated action information) and card feed content (in repository 11*c*) and card rule definition (in repository 11*f*). Card rule definitions repository 11*f* may include databases storing card transformation rules, cards adaption rules (including adapting existing cards to foreign interfaces), business logic rules, filtering rules and card generation rules (including analysis of the data repository and finding conditions which lead to the generation of specific cards), prioritization rules, product matching history, user query history, collected business intelligence and user/site relationship data (e.g. follow/friend definitions) as discussed in more detail herein below. It will be appreciated that the above-mentioned repositories may have vastly varied sizes and update rates. For example, operational data repository 11c may contain per-website building system-user and per-website building system-hosted-site-interaction data which may be substantially larger than the other repositories. In an alternative embodiment, website building system 20 and product card system 10 may be substantially integrated and some elements of card information repository 11 (such as 11c above) may be stored inside or as part of the website building system repositories 22 and 23.

Card marketplace 101 may provide an internal marketplace which may allow various third/fourth party designers to offer card types for sale (similar to the app store concept).

Rule engine 110 may handle card-related events (e.g. creation, deletion, transferring, attribute changes, associated action activation etc.) and may perform various system operations according to an underlying business logic defined using a set of rules stored in card rule repository 11f.

For example, product card system 10 may generate alerts or reports to the site owner. A simple alert (on a hotel website) may notify the hotel website owner of a new room reservation or a new arrival. A complex alert would notify the owner that a room planned check-out is followed immediately by a planned check-in to the same room, and thus the room needs urgent cleaning or other handling. Such alerts or reports may function as activation hook triggers to product card system 10 as described herein below.

It will be appreciated that rules typically consist of an activation hook based on an event or event combination (e.g. operate when a card is created or modified) together with additional logical conditions (e.g. "operate only on Fridays"). These may include user defined or user related criteria related to indirect parameters of the card, such as attributes of user(s) referenced in the card. This could be used, for example, to redirect customer questions chat cards to a Spanish-speaking visitor assistance representative (which uses product card system 10) based on detection of the language used in the chat card or the country of origin of the e-shop visitor.

It will be appreciated that rules may be created using a rule editor (possibly integrated with website building system 20) or a rule specification language.

Rules may be pre-defined to create cards 70, modify cards 70 or delete cards 70. An example would be a rule applied on a hotel management website, which creates an alert card 70 whenever a room has a check-in and a check-out which are close together (e.g. less than X hours apart). The business object underlying the created card would be the specific room involved. Such a card would be posted to the hotel shift manager feed and to the feed used by the cleaning staff.

It will be further appreciated that business logic rules (which may be activated due to system events) are different from the transformation rules defined earlier (which are activated when a card is transformed and govern the transformation process). However, a business rule may also invoke a transformation rule (so to create a transformed card under specific business conditions).

System 100 may also support dynamically added rules, which are added (for example) by site owners through product card system 10 or an on-line version of the rule designer (as described herein below).

An example would be a rule added by a hotel site owner, when receiving notification of a booking by an important repeat client, specifying that the hotel should provide certain amenities to this client upon check-in.

Such a rule would be activated upon the said check-in, and would generate an additional card detailing the amenities to be added.

In an alternative scenario, the hotel site owner may directly create a reminder card 70 (rather than dynamically creating a specific rule).

Such rules may take the form of insights, similar to those created by system 100 in conjunction with business analysis cards as described herein below. Such an insight may be an instruction or reminder for the site owner to take some actions.

It will be appreciated that rules are typically defined by a site owner through a rule definition tool or UI (the rule designer) integrated into website building system 20. The rules are then stored as part of a per-site section of the card rule repository 11f.

A rule designer may have an off-line version (for pre-defined rules) and an on-line version (for rules added dynamically during site operation).

It will be appreciated that there are many ways in which products may be classified, including any of the following or a combination thereof. User 60 may explicitly set up the classifications (assisted by the relevant user interface, such as visual editor 26).

Product classifier 109 may classify products according to once received from user 60 such as products described in message cards (via text, voice, image, video or other media types) and not just site pages. Such analysis may require an advanced analysis (e.g. using AI analyzer 111). For example, a user 60 can post a picture showing 5 people wearing various shirt types, and ask site owners "do you have a shirt like the long-sleeved one in this picture". Product classifier 109 may use inheritance classifications (with modifications) from a template or other product definition which is used to construct the current product definition. Product classifier 109 may generate, for example, a ID or pointer into the business object taxonomy repository 11b, a set of such pointers or ID's, or a formal query which may be applied later to the repository 11b. It should be noted that product classifier 109 may gradually modify and adapt repository 11b based on previous product queries and classification (and possibly inferences made by AI analyzer 111), making repository 11b a "live repository" which improves over time.

Product classifier 109 may also classify based on analysis of the site structure (e.g., what is the relevant product page in the shoes section or the shirts section). Such product pages may be virtual pages, i.e. pages automatically generated based the content of a product database.

Product classifier 109 may also classify based on an analysis of the displayed (and possibly virtual) product page or its underlying components (e.g. a text analysis of the product description, image analysis of the product picture, using the price to determine between multiple possible product classifications). It will also be appreciated that this analysis may be employed to classify product references in other cards such as a chat card discussing car types.

Product classifier 109 may classify based on an analysis of the data items underlying the product page. It will be appreciated that product card system 10 may allow product classifications to be derived directly from the underlying items, which may include additional or better structured information.

Product classifier 109 may classify based on site editing history (e.g. item X was added as a part of group of flannel men shirts). Such history may be gathered based on actual site page usage, or based on use of the data records underlying the generated virtual pages. It also may classify based on site usage history (e.g. previous manual matchings made between this product or similar products and other fully analyzed products) and learning (including deep learning) through AI analyzer 111 using previous queries and matchings as described in more detail herein below.

It will be appreciated that as is typical with product taxonomies (including, hierarchical taxonomies), a product may have multiple classifications. Some of the classification techniques described herein above may also be based on matching the product against other products (which include classification information). Such techniques are also useful for use by product matcher 104 as described in more detail herein below.

Card creator 102 may create cards 70 to represent activities and events in website building system 20. For example, whenever a shop owner defines a specific sale or promotion in his e-shop, product card system 10 may create a specific "sale" card and may post it to the card feed of the store owner and the store visitors (and possibly to people who expressed interest in the store or the product, e.g. "followers", even if they presently do not visit the store). Product card system 10 may also aggregate multiple activities/events in website building system 20 as a single card.

Figure 5:
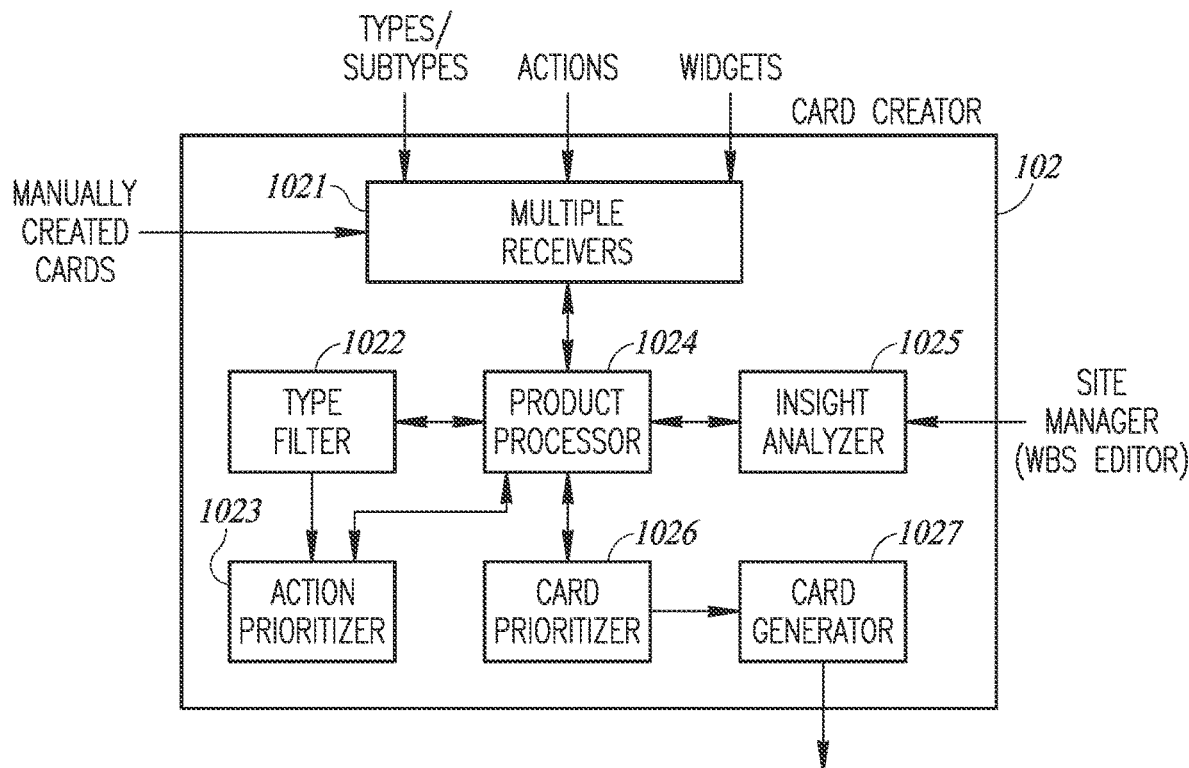
FIG. 5 is a schematic illustration of the elements of the card creator of FIG. 3; constructed and operative in accordance with the present invention.

Reference is now made to FIG. 5 which illustrates the elements of card creator 102. Card creator 102 may comprise multiple receivers 1021, a type filter 1022, an action prioritizer 1023, a product processor 1024, an insight analyzer 1025, a card prioritizer 1026 and a card generator 1027.

As described in US Patent Publication No. 2015/0089354 and discussed here in above, created sites may include third party applications which may exchange information (with the website and with each other) using standardized, structured messages (activities). Some or all of these activities may correspond to specific cards 70 which may be created to represent the messages and displayed in the relevant user feeds.

It will be appreciated that the creation of a card 70 (widgets, actions etc.) may be based on pre-defined rules (stored in card information repository 11) which may specify under what conditions a card 70 should be created. Based on an action or request trigger (such as the activation hooks described herein above), multiple receivers 1021 may retrieve and receive the associated card types/sub types, associated widgets and associated actions as stored in card information repository 11 according to the relevant rules. The received trigger may sometimes already have an associated card type/subtype (e.g. when system 100 is required explicitly to create an "order product" card) and sometimes may not (e.g. the trigger is "the user entered shop X—do we have a card associated with this"). It will be appreciated that such rules may be evaluated based on the trigger itself, (e.g. the shop entry above), schedule (time X arrived) or periodically.

It will also be appreciated that in addition to the rules, card creator 102 may create a card based on analysis performed by insight analyzer 1025 and AI engine 111 as discussed in more detail herein below.

Multiple receivers 1021 may also receive any manually created cards 70 by users 60 for generation and display as described in more detail herein below as well as requests to transform card 70 information as described in more detail herein below.

It will be appreciated that third parties may also design a card or related element including layouts and design, the use of the third-party applications within the card, associated actions, back end logic (whether the cards 70 are run on the client, the system server or the third-party server), new business entities, product categories and operation rules. Such third parties may perform such card design operation (for example) through provided tools (via website building system 20), via a definition language or programmatically though a provided API (as discussed herein above). Such third parties may or may not be vendors of third party applications for website building system 20.

Card creator 102 may create a card 70 for a specific user 60 based on his direct actions (e.g. a card 70 representing an order made by a site visitor). The incoming action may act as a trigger for card creator 102 to create a card according to the rules and action definitions provided by rule engine 110 based on the rules stored in card rule repository 11*f*.

It will be appreciated that another trigger may be external real-world information such as a user's live physical (e.g. GPS-based location/speed/direction), environmental, biometric, physiological or psychological parameters, as well as or interactions with other people or objects, as received from sensor 80. An example of this information is tracking a user 60 entering or leaving a specific shop. The entry of user 60 into the shop may trigger a card offering sale items for the particular shop. Conversely, a substantial physiological response to a given system action such as a specific card 70 display (as detected relevant sensors) could also trigger additional product card system 10 activity or factor as parameter for a rule which controls further such activity. It will be appreciated that such received information may serve not just as a trigger but also as an input to card 70 presentation, selection and ordering processing. These may be received by product system 10 via external sensor and information receiver 112 and may be received by card creator 102 via receiver 1021 as a form of action trigger.

Card creator 102 may also generate a card relevant for the specific time of viewing (e.g. "Your haircut is starting in 4 minutes", or "Today 2 new guests are checking into your hotel") as well as a card 70 for the specific user 60 based on analysis of the activity (direct user activity or visitor activity in a site owned by the user) of user 60. Examples include business analytics results or site improvement recommendations generated for the specific site owner (also known as insights).

It will be appreciated that card creator 102 may generate such business analytics cards 70 periodically (e.g. daily sales summary) or based on triggers such as scheduled/calendar events (generating Christmas sale cards when Christmas is approaching) or conditions (e.g. "Congratulations, your daily hammer sales exceed $1,000 for the first time!!" or "this product is in high-stock/low-demand, how about creating a promotion for it?").

Such a card 70 may also be initiated by the website building system 20 vendor as a trigger based on analysis of the population of eligible users. Examples may include an "enter your store to the special promotion contest" card 70, or an "Upgrade your site to VIP hosting and receive X, Y and Z" card 70. The analysis may be based on user and site parameters as further described in US Patent Publication No. US 2016/0350794 entitled "System and Method for Capability Packages Offering Based on Analysis of Edited Websites and their Use" published Dec. 1, 2016, now issued as U.S. Pat. No. 10,558,998 granted on Feb. 11, 2020, and assigned to the common assignee of the present invention. It will be appreciated that the analysis itself may be fully automated or manually initiated.

Another example would be a business analytics card 70 for a blog site displaying the days of the week in which site visitors read the blog. If (for example) most site visitors visit the blog on weekends, system 100 may place in card 70 an insight from the site manager suggesting to the blog owner to write new blog posts on a Thursday.

It will be appreciated that such an analysis may be made on behalf of site visitors as well (e.g. "Wow, you exceeded $1,000 in purchases through our system in the last 12 months" or "here are the top 5 stores for backpack X"). Such site-visitor-side analytics cards could reflect events or analysis that spans multiple separate (but typically related) sites or working sessions.

It will be appreciated that the generated insight cards may be design-related in addition to the operational insights described above. Insight analyzer 1025 may analyze the site of user 60 (including the site's components and layout, editing history, underlying site data, third party application/vertical usage history etc.).

Insight analyzer 1025 may also integrate the actual collected operational data and business intelligence for the current site together with design and BI information gathered from additional website and mobile apps, including such sites and apps not visited by user 60. Insight analyzer 1025 may only be activated when enough relevant/similar additional websites and mobile apps can be analyzed on aggregated level, to preserve the privacy and anonymity of these additional analyzed websites, prevent use of proprietary information which is not aggregated from a substantial number of sites, and allow the analysis to have sufficient statistical significance. Furthermore, system 100 may offer an opt-in or opt-out mechanism, whereby a site would allow some or all of their information to be analyzed (and could specify which information), for example in return for receiving similar analysis from other sites or some other form of (monetary or otherwise) incentive.

The result of such analysis may include suggested changes and modifications to the current site (or mobile app) which may be conveyed as insight cards 70 (e.g. "Many e-stores similar to yours have recently added introduction videos to their opening screen, how about adding one?").

Such insights may be purely design-related ("how about changing design X to Y, it would look better") or may be mixed design and operational issues ("making change R to your site is known to provide better sales of product type Z"). Suggested changes include external as well as underlying data ("content") of the site or visual application. For example, if system 100 identifies that a certain product has low number of views, but on the other hand has a high conversion rate (sales/views), system 100 can suggest upgrading the product to a more visible place in the e-shop's product gallery (by suggesting a change to the site content).

For some site changes, product card system 10 may offer to user 60 the option to perform the change on his behalf ("press < do it> to have the system do it for you") by instructing website building system 20 to perform the change, or by directing user 60 to visual editor 26, allowing him to modify the relevant pages and components by himself.

Insight analyzer 1025 may use methods described in US Patent Publication No. 2017/0032050 entitled "System Integrating a Mobile Device Application Creation, Editing and Distribution System with a Website Design System", published Feb. 2, 2017, now issued as U.S. patent Ser. No. 15/224,616 granted Sep. 8, 2020, and assigned to the common assignee of the present invention. Insight analyzer 1025 may further integrate design quality and diversity metrics as further described in US Patent Publication No. 2016/0371312, entitled "System and Method for the Creation and Use of Visually-Diverse High-Quality Dynamic Visual Data Structures", now issued as U.S. patent Ser. No. 15/224,579 granted on Jun. 12, 2018 and assigned to the common assignee of the present invention.

As discussed herein above, AI analyzer 111 may make use of AI techniques (and deep learning in particular) to analyze the result of such suggested insights (if implemented). AI analyzer 111 may also accumulate knowledge about performed analyses, offered insights, implementation of the insights and the results of their use to provide a complete feedback loop.

AI analyzer 111 may also use information from additional sites based on similarity parameters (geography, product types etc.) as well as product taxonomy to analyze product similarity. AI analyzer 111 may also accumulate knowledge about user 60 such as what interests them, their user behavior and preferences across multiple sites (such as product types viewed and purchased) and their interaction details, such as response time, exposure times etc.

As an example, card creator 102 may generate actionable recommendations to users 60 based on a recent history of business events. For example, recommending to the e-shop owner to place a product on discount or to promote it on Facebook. As further detailed in US Patent Publication No. 2015/0089354 and discussed herein above, created sites may include third party applications which may exchange information (with the web site and with each other) using standardized, structured messages (activities). Card creator 102 may rely on the activity history of the site as stored in repositories 22 and 23 to generate actionable conclusions and recommendations.

In this scenario, receiver 1021 may select and receive the card types and sub-types that are relevant for recommendation as insights.

Type filter 1022 may then reduce the set of received card sub-types to a list T (of card types and sub-types) by removing sub-types for third party applications/verticals not installed on the site (e.g. removing hotels cards which are not relevant to an e-shop site).

Type filter 1022 may then remove sub-types that don't belong to the target's (e.g. visitor) category (such as a restock card), sub-types that are not associated with a business object and sub-types that don't have an action related to a business object.

Action prioritizer 1023 may then remove irrelevant actions and prioritize the remaining actions, creating a list A (or relevant actions) associated with types/sub-types in T. Action prioritizer 1023 may remove all actions that do not appear in list T and may assign a numeric priority for each action according to a pre-defined configurable table that correlates priority with potential gain to business KPI's (Business Key Performance Indicators) by this action.

Examples may include: a "Promote on Facebook with ad budget" action=150 (correlates to site KPI of more traffic), a "share on Facebook" action=100 (correlates to site KPI of more traffic), a "place on discount" action=80 (correlates to site KPI of increasing sales) and a "Write a new blog post" action=50 (correlates to site KPI of more traffic by more content).

Other examples may include a "restock product" action=30 (correlates to site KPI of increasing sales), a "contact customer" action=10 (correlates to site KPI of increasing customer retention), an "open product details" action=0 (no correlation to any business KPI), a "see recent orders" action=0 (no correlation to any business KPI) and a "remove all actions with priority value of 0".

Product processor 1024 may then process the set of existing business object instances (e.g. "red leather shoes") to create a recommended list by removing irrelevant business object instances and prioritizing the remaining ones, creating a list O (of business objects). Product processor 1024 may then remove business objects whose type isn't the target of an action in list A and for each remaining business object instance, query the history of activities relating to this instance. Product processor 1024 may assume that the generation of activities correlates with increasing business KPI's, as for example "product X sold" is an activity.

Product processor 1024 may then assign a numeric score, using the following modifiers:

If the business object instance has N1 activities in the last D1 days, increase score by M1*N1 where M1 is a configurable modifier weight value.

If the business object instance has N2 activities in the last D2 days, increase score by M2*(Mx–N2) where M2 is a configurable modifier weight value and Mx is the max number of activities for this business object type.

Card prioritizer 1026 may create a prioritized list of suggested cards C as a result of product processor 1024. Card prioritizer 1026 may pair all business object instances in list O with card sub-types in list T (that have matching business object type).

Card prioritizer 1026 may assign each such pairing the priority value of Po*Pa where Po is the score of the business object instance in list O and Pa is the score of the card's action in list A. It will be appreciated that due to the importance of parameter selection by action prioritizer 1023, various value sets may be tested by website building system 20 using an experiment module (as discussed in US Patent Publication No. 2016/0124839 entitled "System and Method of Handling Complex Experiments in a Distributed System", published May 15, 2015, now issued as U.S. Pat. No. 10,733,078 granted Aug. 4, 2020 and assigned to the common assignee of the present invention). For each value set, a large group of users (for statistical significance) is tested and compared using top-level business KPI's of the system such as sales volume or traffic.

Finally, card generator 1027 may generate the resultant card by binding the required fields in card 70, i.e. types, product information, widget information, actions etc. based on card definitions repository 11e.

It will be appreciated that card creator 102 may generate a card 70 for user 60 based on the activities of another user which affect the current user 60. Examples include direct messaging from another user 60 e.g. chat request or product inquiry) or a notification of an incoming site visitor relayed to the site owner.

Card creator 102 may generate a card 70 due to various system notices and alerts. These could be technical (e.g. site is down), operational (e.g. out of stock warning) or informational (e.g. increased traffic in specific site section).

Card creator 102 may also generate a card 70 due to past user activity. For example, a product order made by a site visitor may be represented (until shipped or delivered) as a pending order card, possibly in both site owners' and site visitors' feed. Card creator 102 may also generate additional or follow-up cards such as "your order X was shipped today" (or update a dynamic card as discussed herein above).

Card creator 102 may also generate a card 70 due to activities of other users and products followed by user 60. These could be the users' friends (if social networking functionality is implemented), e-shop and groups subscribed by user 60 (e.g. "your favorite store just has a season-end sale") etc. It will be appreciated that this may apply to site owners, i.e. a shop site owner may follow specific products to get information about industry trends.

As discussed herein above, website building system 20 may allow the site owner (e.g. e-shop designer) to include banner ads in the edited site. This could be done manually (e.g. including a banner ad object within visual editor 26), or semi automatically as part of automatic product page creation.

Thus, when the site visitor presses the banner ad, system 100 may redirect the site visitor to specific (e.g. product) page, start a chat card 70 or generate an order (with a matching order card 70).

In an alternative embodiment, system 100 may allow the site owner to generate an "external" banner which may be placed in web pages outside of system 100 (e.g. using a "make banner" button included in a product database editor). Such banner ads may be packed into a set of files, may be embedded in external web sites, and may perform any of the functions above even if invoked in an external system.

It will be appreciated that website building system 20 may also include functions which allow the user 60 (site owner or site visitor) to explicitly create cards 70. For example, an e-shop primary application may provide a UI whereby the site visitor may convert any single item (or an entire shopping cart) into a card using a "buy me now" or checkout function. Product card system 10 may also allow user 60 to create cards which do not reflect actual activity in the website building system 20, e.g. creating a bookmark card for a product ("have a look at this shirt later" or "create a reference to this product in my chat session"), which doesn't affect any website building system 20 ordering or other activity. Another example is a "share" functionality on a product in the e-shop which will generate a card 70 for this product for sharing on a various channel like a chat conversation without affecting website building system 20.

User 60 may also explicitly request to create a card 70 for a communication purpose. An example case is when an e-shop owner is communicating with a visitor (e.g. real-time chat/instant messaging (IM)) and wants to share a card 70 with this visitor (e.g. recommend a product for purchase).

In this scenario, type filter 1022 may select the card types and sub-types that are relevant for the communication and reduce them to a list T by removing sub-types that cannot be shared over the relevant communication channel, removing sub-types for third party applications/verticals not installed on the site (e.g. removing hotels cards which are not relevant to an e-shop site), removing sub-types that don't belong to the communication target's (e.g. visitor) category (e.g. restock card) and removing sub-types that are not tied to a business object.

Next product processor 1024 may select the business object types (e.g. products) that are relevant for the communication and reduce them to a list B by removing business object types that do not appear in a card 70 on list T, removing business object types that are incompatible with the target of the communication (e.g. "order" business object for a visitor who never placed an order).

Product processor 1024 may then select the business object instances (e.g. "red leather shoes") that are relevant for the communication.

Next product processor 1024 may reduce the list of all business object instances by removing business objects whose type does not appear in list B and for business objects that have a pointer to a visitor (e.g. order points to a customer), removing all business objects not pointing to the target of the communication.

Product processor 1024 may then assign each remaining business object instance in list O a numeric score, using the following modifiers:

If the business object instance was last updated in the last D days (on day d), increase score by M1*([Current date]−d) where M1 is a configurable modifier weight value.

If the business object instance was last viewed by the initiator of the communication in the last H hours (on hour h), increase score by M2*([Current hour]−h) where M2 is a configurable modifier weight value.

If the business object instance was last viewed by the target of the communication in the last H hours (on hour h), increase score by M3*([Current hour]−h) where M3 is a configurable modifier weight value.

For keyword relevance product processor 1024 may generate a list of keywords K for the business object instance. These could be, for example, explicit keywords already found in the data model or keywords created by splitting the content of some fields (like "title") into words. In this scenario, the modifier would be:

For every keyword in list K, that appears N times in the last W words in the communication, increase score by M4*N where M4 is a configurable modifier weight value and W is a configurable parameter as well.

Card prioritizer 1026 may then create a prioritized list of suggested cards C as a result of the processes above. Card prioritizer 1026 may pair all business object instances in list O with card sub-types in list T (that have matching business object type) and may then assign the priority according to numeric score value of the business object instance computed by product processor 1024.

It will be appreciated that the modifiers as discussed herein above perform the calculations based on the current date and time. However, an embodiment of the processes may perform this calculation for a different effective date and time.

It will also be appreciated that system 100 may support cards 70 which refer to abstract products rather than a specific product by a specific vendor (e.g. a website). For example, website building system 20 may support a "bookmark this product" function (which creates a card pointing to a specific product in a specific e-shop). However, system 100 may also offer a "bookmark this product type" function, which would create an abstract product bookmark card. Such an abstract product card may be used, for example, to search other sites for matching products (as further discussed below).

It will be further appreciated that cards 70 are generally created for a specific user 60. However, system 100 may allow the creation of cards 70 which are distributed to multiple users 60. For example, a martial arts training group manager (e.g. chief instructor) may create a card 70 describing a workshop to be run by a visiting senior teacher. Such a card 70 would be displayed to all group's website visitors (when they visit the website), and in the feed of all regular students of the training group (even if they don't visit the site).

It will be appreciated that a card 70 may also include a reference to a product or actions related to external systems 40, such as an Amazon e-shop item.

Figure 6:
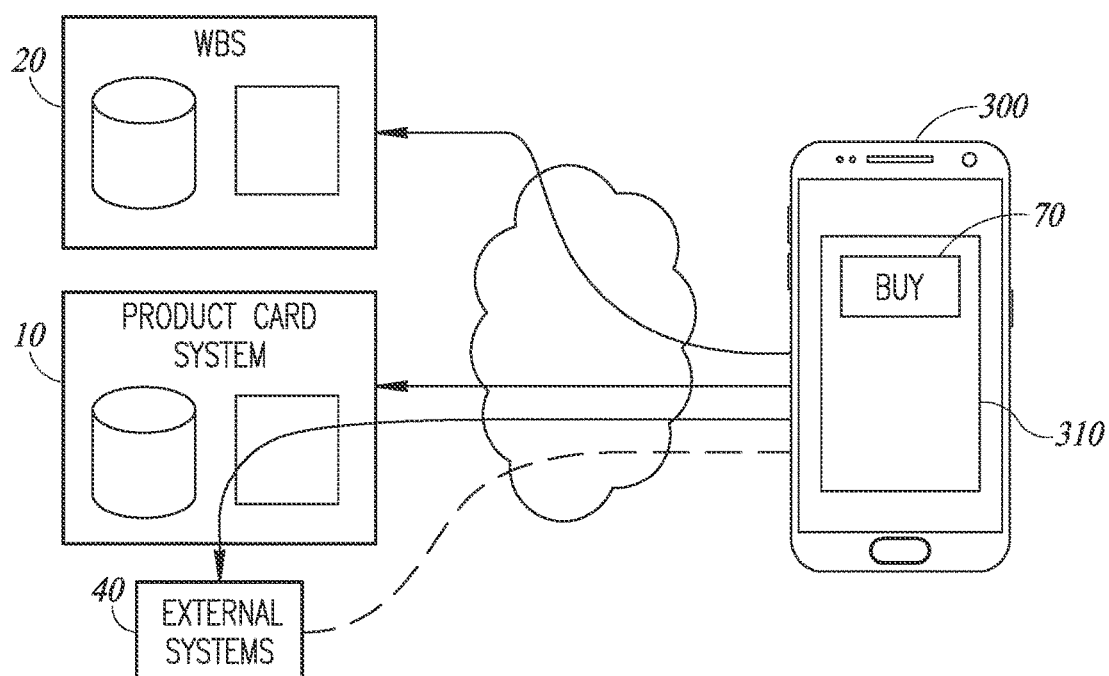
FIG. 6 is a schematic illustration of the interface of the product card system of FIG. 2 with a mobile device system; constructed and operative in accordance with the present invention.

Such cards 70 are handled as all other regular cards 70 (e.g. feed display, transferring, product matching etc. as described in more detail herein below). Associated actions (such as performing the actual purchase from Amazon), may be performed by redirecting to the external system or (possibly) though website building system 20 acting as front-end to the external system. As illustrated in FIG. 6 to which reference is now made, product card system 10 may use mobile device 300, display interface app 310 and "buy" card 70 to perform a transaction with external system 40 through the product card system 10 server. Device 300 may also connect directly to external system 40.

External system supporter/integrator 105 may analyze the product(s) described by the external reference and may instruct card creator 102 to create the card 70 using the external reference as an attribute. External system supporter/integrator 105 may perform a webpage analysis (or a similar analysis applied to displayed pages of a mobile purchasing app). The analysis may include elements of the external page such as: actual external page underlying code (e.g. its HTML, JS or CSS), external page visual representation, the foreign reference location (e.g. page location in the Amazon web site), classification information, taxonomy references and text elements such as title, description, details, recommendations, or other product references.

External system supporter/integrator 105 may also analyze elements such as the product's images, videos or media reviews, information about the page or the product in $3^{rd}$ party resources (on-line or off-line) and matching done against a similar or "neighboring" product, e.g. analyzing an Amazon product based on the analysis done on another (similar or somehow connected) Amazon product.

Alternatively, external system supporter/integrator 105 may allow a card action to activate an external program such as drop shipping to an external system 40, operate an external printer or request a re-stock from a supplier by communication separately with his system.

It will be appreciated that such an analysis may also apply to the actions available for the external product (or other references). Thus, the above mentioned external reference cards 70 may be used in a number of scenarios such as:

A site visitor asks a shop owner—"do you have item like Amazon item X" (or asks for support about it).

A site owner sends a message to a site visitor which refers to external product (e.g. "you need Amazon product X to attend training session Y" or "our car works best with engine oil XYZ").

System 100 may allow the visitor to order the product though website building system 20, but such a request may typically just be re-directed to the product seller (e.g. Amazon), unless it is part of an affiliate arrangement.

It will be appreciated that the product reference is typically temporary and that system 100 does not maintain the reference (e.g. if the external product page was moved or modified) and does not require explicit integration with the $3^{rd}$ party seller (except for the affiliate arrangement).

External system supporter/integrator 105 may also adapt card 70 to different host environments and may provide a (dynamically loaded/updateable) set of adapters allowing cards 70 to operate within different environments.

Once card 70 has been generated by card creator 102, card feed displayer 107 may generate and continuously update the display feed of cards 70 to user 60 in a specific data feed or other scrolling display when user 60 enters product card system 10. Feed displayer 107 may use multiple display forms (alternatively or simultaneously) in addition to a card feed form. For example, feed displayer 107 may support the presentation of cards 70 through a virtual keyboard (which can be used in a mobile device operating system). Such a keyboard may implement regular keyboard keys, but may also display (for example) cards 70, card elements and additional supporting "keys" such as relevant products, product attributes and product categories (which can be used for searching or to support chat activities). Such a keyboard may be specific to the current site.

Figure 7:
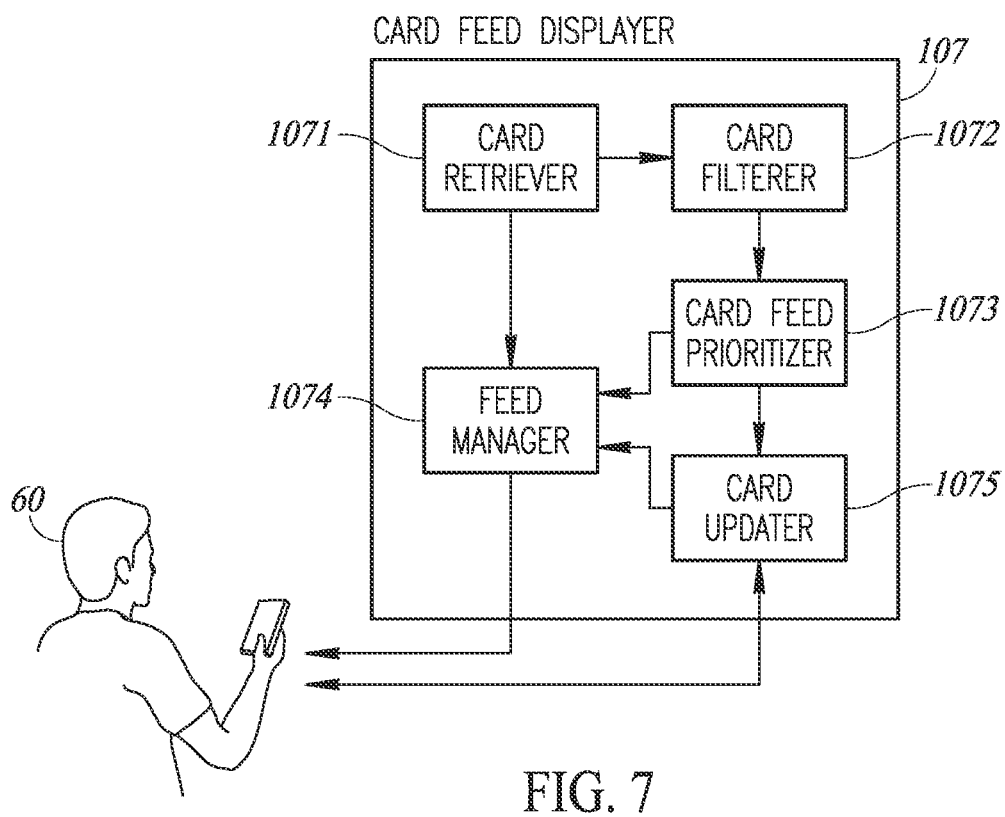
FIG. 7 is a schematic illustration of the elements of the card feed displayer of FIG. 3; constructed and operative in accordance with the present invention.

Reference is now made to FIG. 7 which illustrates the elements of feed displayer 107. Feed displayer 107 may comprise a card retriever 1071, a card filterer 1072, a card feed prioritizer 1073, a feed manager 1074 and card updater 1075.

It will be appreciated that feed processing is typically performed in the front-end element of product system 10, though it may also be done in the back-end element of product system 10, or divided between the two elements.

Card retriever 1071 may retrieve cards 70 from multiple sources such as cards 70 generated for the user 60 (as described herein above) by card creator 102 and cards 70 generated for sites selected by user 60 (e.g. sales promotions published by shops the user is interested in). Other cards 70 may be those specific cards (e.g. promotions) published by a site owner to visitors according to lists stored by system 100, such as a subscriber list, current visitors list, past site visitors list or past purchasers list and cards 70 cards generated as part of a chat conversation initiated by site owner or site visitor. These lists may be stored in either repository 23 for website building system data or on operational repository 11c for product card system data.

Card filterer 1072 may filter the retrieved cards 70 for relevance to be placed in the feed based on criteria such as: urgency (e.g. remove non-urgent cards 70), user 60 interest level and past interaction with similar cards in the past which could be based on user 60's own interaction, user 60's friend's interactions, other interactions with the same or similar sites (e.g. similar e-shops) or other interactions with the same or similar products to these described in the evaluated card 70. It will be appreciated that the user 60 interest level in a specific card 70 may be positive or negative. For example, system 100 may allow a user 60 to swipe a card away, and then not present the card to user 60 (and possibly similar cards 70 as well) for a given time period (e.g. a week).

Card filterer 1072 may also filter based on user-defined criteria (e.g. areas of interest defined by the user, "don't show me spring sale promotions", etc.). User defined criteria may also include product comparison and matching criteria (e.g. "only show clothing promotion for black outfits" or "only show yacht promotions for yachts like XYZ"). Such product comparisons may be based on the outcome of product matcher 104 as described in more detail herein below.

Card feed prioritizer 1073 prioritize the cards 70 to be used in a feed and may use set card 70 priorities based on criteria such as giving high priority/overriding visibility to "emergency" related cards 70 and promoting paid content according to a given criteria (such as through a built-in feed advertising space exchange).

Card feed prioritizer 1073 may also use user 60 initiated criteria (e.g. "Always show any 'out of stock' card in my e-shop at the top of feed") or other mechanisms which allow user 60 to gradually teach system 100 about his interests (e.g. "Show me more/less cards like this one").

Card feed prioritizer 1073 may also prioritize based on previous interactions and engagements of user 60 with the specific card type or sub-types, specific vendor or vendor type, specific product or product type etc. (as gathered by the system in a user activity repository). Such activities may be external to the card. For example, card feed prioritizer 1073 may recognize that a visitor is buying a lot of t-shirts, and thus promote t-shirt related cards, even if such purchasing was not done by responding to the t-shirt promotion cards themselves (e.g. pressing a "buy it" button) but rather done directly in the relevant e-shops. AI analyzer 111 may further apply AI techniques or deep learning to collected information related to any of the above.

Card feed prioritizer 1073 may prioritize cards 70 based on user 60 making cards 70 or card categories "sticky", by specifying their explicit priority, or (conversely) specifying that specific cards 70 or card categories are less desirable or should not be shown for a certain period of time. Card feed prioritizer 1073 may further modify a card priority according to externally available information (e.g. increasing priority and thus the visibility of sales-related cards 70 as a "Black Friday" sales event date is approaching).

As discussed herein above, card feed displayer 107 may implement card filtering and prioritization by learning from user 60 about his interests during ongoing usage.

It will be appreciated that system 100 may maintain (in operational data repository 11c) multiple instances of a table having an entry for each card type and sub-type holding a numerical score per sub-type, known as a score modification number.

An instance of this table is maintained per user 60 and per medium of card 70 consumption. For example, website building system 20 may have 2 users (an e-shop owner and an e-shop sale-person), 2 channels of card consumption (a feed in the website building system 20 desktop management interface website and a feed in a mobile app). Such a system may have 4 instances of the table (2 users times 2 channels) for each card type/sub-type. These tables may be known as accumulated score tables.

It will be appreciated that rule engine 110 may maintain a list of rules stored in card rule repository 11f, e.g. a rule for each potential system operation (not card actions) embodying a user 60 interaction with a card 70. For each such system operation the rule specifies a score delta (addition/subtraction) applied to the score of card 70 when the specific interaction takes place. An alternative embodiment may include a multi-dimensional matrix of rules, e.g. having a rule for each system operation and card type/sub-type. The score delta is correlated with the required user investment for doing this action. For example:

For cards sent via push notification, when push notification is clicked on when the system is inactive=increase score by 100 points.

Card being hidden=decrease score by 5 points.

Card being marked as completed=increase score by 10 points.

A card action is performed by the user (e.g. "See Order Details" for an order card)=increase score by 10 points.

User clicks on system operation "Show me more of this card"=increase score by 100 points.

User clicks on system operation "Show me less of this card"=decrease score by 100.

User stops scrolling the feed when the card is in-screen=increase score by 1 point.

When the user performs a system operation for which a rule exists in repository 11, the accumulated score table is updated according to the delta score.

The next time the card feed prioritizer 1073 prioritizes cards for display, card feed prioritizer 1073 considers the current score value in repository 11c. Card feed prioritizer 1073 may assign a numeric value per card 70 instance and then may sort the available cards 70 according to this value.

By assuming that the current priority value for the card is V, card feed prioritizer 1073 may take the card sub-type, look it up in the relevant accumulated score table instance and take the score modification number S. It may multiply S by a pre-defined weight W (a configuration parameter of system 100) and add to V: meaning V'=V+S*W.

It will be appreciated that the feedback loop between updating the accumulated score table and the numeric value assignment per card 70 may continue indefinitely as applied by AI analyzer 111. It will also be appreciated that various dynamic data structures as described herein above (such as the accumulated score table) are persistent, i.e. are maintained continuously for user 60, and are not reset even if user 60 works with system 100 through a series of separate sessions, or possibly even from multiple devices.

Due to the importance of parameter selection the scoring as discussed herein above, various value sets are tested website building system 20 as discussed in US Patent Publication No. US 2016/0124839. For each value set, a large group of users (for statistical significance) is tested and compared using top-level business KPI's of system 100 such as retention and general rate of engagement with system 100. Such testing may be performed through an experiment management system such as the one described in US Patent Publication No. US 2016/0124839.

It will also be appreciated that the processes as described herein in above, function and the accumulated score tables are kept for a user 60 within the context of the user's engagement with a single site. This may be done even though a single user 60 may connect (and interact) with multiple sites in multiple roles. Thus, for example, a user 60 may be the owner of one site, a salesperson on a $2^{nd}$ site and a visitor or purchaser in a $3^{rd}$ site.

Applicants have realized that users 60 may show very different engagement patterns for the different sites with which they are involved. For example, a single user 60 may be interested in bookings in one site, and interested in blog activity in another site.

Thus, card feed displayer 107 may display alternative card feeds for each site, or alternatively provide a single unified feed which integrates the interactions with multiple sites. In the latter case, card feed displayer 107 may employ a merging algorithm based on the card 70 priorities derived above for each site's cards 70. Such a merging algorithm may merge the results of multiple instances of the single user/site process.

In an alternative embodiment, system 100 may maintain accumulated score tables in repositories 11c and 23 which relate to specific user/site groups rather than specific users (i.e. providing score modification number which can be applied to multiple users 60 or sites rather than specific users 60). Such a group may include user 60 classes (such as designer/shop owner/visitor) rather than a specific user, sites type, geography, or any of the criteria specified for population selection criteria as described in Patent Publication No. US 2016/0124839, now issued as U.S. Pat. No. 10,733,078).

These scores from such group-based accumulated score tables may have a lower weight and card feed displayer 107 may typically optimize for a specific individual user 60, as the individual user's history is the optimal way to estimate the preferences of user 60. Card feed displayer 107 may use AI analyzer 111 (based for example on a deep learning algorithm) to determine the best way to integrate the individual user and various group-based scores.

As discussed herein above, card filterer 1072 and card feed prioritizer 1073 may depend on weights which may be gradually modified by card feed displayer 107 based on the user's use of system operations or associated actions. For example, a (repetitive) use of a "hide this card" or "don't show cards like this anymore" would lower the priority of a specific card type, or cause it to be filtered out altogether.

Product card system 10 may provide specific variants of the feed display for site owners and site visitors (as well as other user categories described above). Furthermore (and as described herein above) identical cards displayed in feed for different user types may have different widgets (as discussed in more detail herein below) and thus a different visual representation.

Feed manager 1074 may support additional operations on cards 70, affecting the cards 70 themselves and their appearance in the feed. Such operations may include (for example): re-sort feed, filter feed, hide/unhide cards, delete cards, archive cards and add notes to cards and set attributes (e.g. used to prioritize cards 70).

Feed manager 1074 may also provide an explicit "search my feed" mechanism to provide current and historical feed searching and card feed selective highlighting, e.g. change card background color to red for all cards reporting stock shortage.

Feed manager 1074 may also collapse multiple cards, i.e. merge cards with related elements into a single card. Feed manager 1074 may merge cards 70 based on product similarity i.e. may merge cards 70 whose products are similar when compared using a product semantic tree. For example, merge multiple shirt-related cards 70 into a single card 70. Feed manager 1074 may also merge cards 70 based on user interests, for example, if card feed displayer 107 detects that the user is interested in shipping times, feed manager 1074 may merge cards related to shipping times and re-arrange them in calendar or date list format (according to shipping time).

It will be appreciated that the feed may act as a focal UI point for the various actions which can be performed on each card 70 (such as the cards' associated action, transfer, transform etc. as discussed in more detail herein below).

It will also be appreciated that changes made to card 70 may affect its attributes as far as the filtering and prioritizing above are concerned. For example, each order to the e-shop may result in card 70 being displayed in the merchant's feed. A merchant may get an order and mark it as "shipped". The priority assigned to a pending (not yet shipped) order card may be different, and typically much higher, than that assigned to a card associated with a product which was already shipped.

Card filterer 1072 may also filter potential cards 70 according to the requirements or context of user 60 and according to a specific action that user 60 is trying to do. For example, an e-shop owner engaged in a chat conversation with a visitor can share a card with the visitor. The cards available for sharing will be ones most relevant for this sharing context (e.g. product cards/promotion cards 70).

It will be appreciated that card feed displayer 107 may support a card feed which includes cards 70 based on real-time updated info from system 100 (live cards).

Card updater 1075 may update cards during their display in the feed. Card updater 1075 may also use pre-defined rules as stored in repository 11f, rules under which card 70 may be updated. It will be appreciated that cards 70 may appear or disappear based on the updated information and that their presentation and priority within the feed may be affected by this live data. The changes to the card 70 presentation may be complex, based on specific update functionality included with the widget definition in widget repository 11a. For example, a card may show a live graph of the current number of visitors in a site (as reported by website building system 20's hosting server), or a running graph of external data (such as a given share price).

It will be appreciated that cards 70 may be affected by real-time updated information from system 100. These cards may be known as live cards 70. Card updater 1075 may as a result, add or remove such cards 70 to/from a feed or may change their presentation or sort order. It will also be appreciated that card updater 1075 may turn such a live card 70 into an interactive card 70. An example may be the addition of a tip to a restaurant payment card.

As discussed herein above, system 100 may provide a set of generic operations on cards 70, which are distinct from the card's own built-in actions/operations. Some operations may be available for all cards 70, user categories and interface application, and some may be provided depending on each of these parameters (i.e. card type/sub-type, user category and interface application type). Such operations may include archive, delete, hide/unhide, add notes etc. (as described in more detail herein below).

It will be appreciated that cards 70 may be sent or transferred (together with their actions) between all users 60 (i.e. all combinations of user categories). Sending may be considered the original transmission of 70 card to a given user (from another user or from the system itself). Transferring may occur when user 60 takes a received card 70 and re-sends it to other users 60 of system 100. Transferring may involve transforming the card (as described in more details herein below).

For example, a site visitor may receive a proposed product offer from a site owner and transfer it to one or more of his friends (a "see this great offer" card).

A site visitor may receive a product offer card 70 from an e-shop and transfer it to the same e-shop (e.g. "do you have this in black?") or another e-shop (e.g. "do you have a similar product?"). This may involve transforming or otherwise modifying the card, e.g. by changing the underlying product or product definition or by adding additional notes and parameters.

A site owner may receive an order card 70 from a site visitor, detect (or be notified) that he is about to be out of stock, and transfer the card to his supplier as a "restock" request card. In this scenario, card 70 is transformed as well.

A site owner for a franchisee may receive an order card 70 from a site visitor, determine that he doesn't have the required product, and transfer the card for fulfillment by another franchisee of the same franchisor.

Card transferrer 108 may receive the transfer request and may instruct card creator 102 to create one or more new cards 70 (based on transforming the received card 70 and using data from such received card 70) and may then transfer the newly created cards accordingly.

For example, system 100 may handle a received hotel reservation card which causes very high occupancy by creating an order card 70 for a cleaning company to send extra cleaners or for the laundry company to make laundry more urgent. The created card(s) 70 may include information extracted from the original hotel reservation card and transformed into these cards (such as room numbers to clean).

Similarly, system 100 may handle a high registration to a seminar by creating relevant order cards 70 for more trainers or a larger space.

Card transferrer 108 may transfer these cards via multiple channels such as within product card system 10 itself, e.g. through unicast or multicast channels.

Card transferrer 108 may also transfer these cards via a site promotion sub-system within website building system 20, e.g. a "promote my site" option in website building system 20 which generates promotion cards in the product card system 10 (in addition to other activities such as create a promotion e-mail).

Card 70 transfer may also be done via existing communication channels, such as e-mail, social networks, chat system and other messaging systems. Examples may include, sharing a card 70 in a chat conversation internal to system 100, sharing a card 70 externally on Facebook, sending a card externally to an external chat program (such as Facebook Messenger or Apple iMessage chat) through their $3^{rd}$ party plug-in mechanism (e.g. iMessage Apps) and sharing a card 70 externally between mobile apps on the mobile device using a predefined API of the host operating system (e.g. Apple App Extensions)).

As discussed herein above, system 100 may allow cards 70 to be transformed into new cards 70 which contain information or are otherwise related to the original (untransformed) card 70. Such transformed cards may replace the original card 70, e.g. an e-shop site owner may convert a product inquiry card into a suggested product card 70 and may create an additional (but still related) card 70, e.g. a hotel site operator may transform a room booking card (which requires check-in to be performed shortly after the previous check-out) into a newly created "urgent room cleaning request" card, while retaining the original room booking card.

Card transformation may be manual (e.g. performed by the site owner or operator), or may be performed automatically by card transformer 106.

Card transformation may also affect a single card, or change 'n' cards into 'm' cards (e.g. by merging or splitting cards).

It will be appreciated that transformation may affect presentation, may involve the use of alternate widgets or layouts and may affect product definitions. Transformation may also be based on product comparison via a product semantic tree as well as based on the result of product matcher 104. Product matching can also include matching of partially specified business objects.

It will be appreciated that card transformation is distinct from cards 70 having multiple widgets (i.e. multiple views). A multi-widget card is a single card 70 containing content and attributes that may be presented in several ways. Transformed cards 70 may differ in type and attributes from the original cards 70.

Card transformation is often used in conjunction with card transferring, though the two are distinct and may be used separately.

It will be appreciated that card rule repository 11f may also include a repository of transformation rules. This could be a system 100 wide repository, or one based on definitions associated with each card 70 definition. Rules may be hard-wired and may also be created or modified through a rule editor.

These transformation rules define for each card 70 into which cards it can be converted, and how the card's content, fields and attributes are handled and mapped. The transformation rules may also define specific conditions under which automatic transformation may be performed (or a manual one allowed). For example, a site visitor's order can be transformed into an order from the store to the store's supplier if the specific product supply is running short.

Card transformer 106 may receive instructions to transform a card 70 and may check the associated transformation rules which may include: Generic system level rules ("a product request card 70 can only be transformed into an order card and the fields are mapped X=>Y, Z=>W"), site-specific rules, e.g. when a site uses new card types or a combination of the two.

As an example, a site visitor may receive a product offer card 70 from an e-shop and transfer it to the same or another e-shop ("do you have a similar product?") while transforming or otherwise modifying card 70, e.g. by changing the underlying product or product definition or by adding additional notes and parameters. The visitor may edit the product during the transformation, combining various product and product attribute changes and overriding existing attributes.

Card transformer 106 may also forwarding card 70 as well as collapse it, i.e. card transformer 106 may merge cards 70 with related elements into a single card 70. It may also merge cards 70 based on product similarity i.e. e cards whose products are similar when compared using a product semantic tree. For example, merging multiple shirt-related cards into a single card.

Card transformer 106 may merge cards based on user 60 interests. For example, if system 100 detects that user 60 is interested in shipping times, card transformer 106 may merge cards related to shipping time and re-arrange them in calendar or date list format (according to shipping times). Transformations may also affect card sorting order.

As discussed herein above, a site owner may receive an order card 70 from a site visitor, detect (or be notified) that he is about to be out of stock, and transform the card 70 into a "restock" request card to be sent to his supplier.

A visitor may send a product inquiry card 70, and the shop owner may convert this card 70 into an answer card 70 containing a specific product or gallery of product. Such an answer card 70 may also have a "buy me" button for fast checkout.

As discussed herein above, a shop owner may take a product page (from his own or other sites) or a card 70 from a different merchant and create a card from it. This could be done, for example, to create a promotion for the modified product.

As part of the card creation process, the shop owner may transform the product definition, e.g. take a green shirt product page (from his or other sites) and create a query card asking his wholesaler if he has a similar model in red.

Such transformation may be manual by having the merchant manually modify the product's attributes through a suitable interface.

Alternatively, card transformer 106 may match the reviewed product definition against other product definitions (e.g. product definitions of the target business). This may be performed by automatic matching of products, product attributes and tags, possibly through a product or attribute taxonomy. Product matcher 104 may utilize AI analyzer 111 to learn of previous matches done by system 100 as described in more detail herein below. Card transformer 106 may further allow the user (e.g. shop owner) to override some or all the attributes of the suggested match.

As described here in above, product matcher 104 may match a product (or business object) described in a specific card 70 with one or more other products. This may be performed as part of a product searching process (e.g. "find a blue t-shirt similar to product X" or "do you have that mountain bike model with brakes made by X?"), possibly involving composite queries (i.e. combining multiple product references). This may be performed when suggesting an alternative product or as part of a product classification process (e.g. when analyzing an external product).

Product matcher 104 may match products against product sets defined internally by product classifier 109, or defined in one or more external sites (e.g. non-system e-stores such as Amazon). It will be appreciated that for internal products, system 100 may have internal descriptors detailing the attributes of the various examined products. On the other hand, for an external product, system 100 may only have access to the user visible product page, requiring product classifier 109 to automatically classify them as discussed herein above. Alternatively, some external sites may provide a product information access API (providing structured product information) which can be used by product classifier 109.

It will be appreciated that the matched products may be actual products (having concrete product ID and attribute set) or partially-specified product descriptions and categories ("a blue turtle-neck men's shirt").

A search by product matcher 104 may involve products from multiple (internal and external) sites. Thus, for example, a visitor may ask the system to "find me any store which offers a blue turtle-neck men's shirt".

It will be appreciated that product matching may be exact or approximate. Even an approximate product match may be useful, as it may allow (for example) a shop owner to offer an alternative product ("how about the turtle-neck men's shirt in light blue and silver instead?").

Product matcher 104 may perform product matching according to the attributes or classification of the product. Classification comparison may involve using a classification taxonomy tree.

Product matcher 104 may also match according to the system attributes of card 70 or the product (e.g. using the same template, data item definition or similar system parameters).

Product matcher 104 may match based on analysis of the displayed product page or its underlying components (e.g. text analysis of the product description, image analysis of the product picture, using displayed product attributes if internal attribute representation is not available).

Product matcher 104 may match based on the site usage history, including previous manual matchings made between this product or similar products and other fully analyzed products by the same user or other users.

Product matcher 104 may also use learning (including deep learning) via AI analyzer 111 of previous queries and matchings. The use of previous matching history (manual or automatic), including that made by other users of the system 100, may enable product matcher 104 to learn from manual matching decisions made by the current or additional site owners or site visitors. Thus, if many users matched item X to item Y, product matcher 104 may determine them to be alternative or at least similar, even if their state's attributes do not indicate such similarity.

It will be appreciated that product matcher 104 may use any of the above mentioned matching techniques or a combination thereof.

It will be further appreciated that product matcher 104 may apply the techniques discussed herein above to perform matching of businesses, and not just of products or product definitions. This may become more and more relevant as the number of businesses within system 100 grows. Such matching may be used (for example) for business location, or for system 100 to offer alternative suppliers (and not just for a specific product), e.g. "You reviewed these 3 different shirts, there is an additional e-shop for similar shirts in X".

The matching may also be product (area) specific, i.e. business A matches businesses B1/B2/B3 in the area of shirts, but businesses C1/C2/C3 in the area of sports goods.

The matching could be based on analysis of the offered products, but also based on actual sales results, if available and subject to business privacy issues. Such business matching may typically be offered as an opt-in service arranged using "circles of references". Thus, a shoe business X may elect to opt into a "top shoe" circle, so that his site visitors may be redirected to other businesses in the same circle, but only if other business will also be redirecting visitors to site X. Furthermore, site owner (or the circle) may set specific conditions for redirections, e.g. only redirect if "I'm out of stock for specific items or specific item categories". Then product matcher 104 may offer multiple such circles, involving different business and different referral conditions.

Card communicator 103 may handle all card 70 related communication and routing between the elements of product card system 10 as described herein above.

As discussed herein above product card system 10 may be integrated with website building system 20 in several ways as discussed in more detail herein below.

It will be appreciated that the same product card system 10 instance may interact with multiple websites (or other applications) created and/or hosted by website building system 20. Product system 10 may also simultaneously interact with standalone visual applications 30 not built using the website building system 20 (but containing a plug-in or adapter connecting them to product system 10). Thus, a single card 70 feed displayed by product card system 10 may include cards 70 from multiple website building system 20 built stores (which may support the integration points described below) and non-website building system 20 built stores (which do not support such integration).

As discussed herein above, widgets or views are an essential part of the makeup of card 70 and system 100 may allow card widgets (or views) to be created and edited through website building system 20 manually, automatically or semi-automatically. The person performing such creation may be do so though widget creator 24 as discussed in more detail herein below.

Website building system 20 may provide a (possibly scaled-down) version of visual editor 26 for the editing of card widgets. The edited widget component definitions may include additional hints and information required to define the data bindings between the created widgets and the underlying business objects (e.g. as described in US Patent Publication No. US 2014/0282218 entitled "Device, System, and Method of Website Building by Utilizing Data Lists", published Sep. 18, 2014 and assigned to the common assignee of the present invention.

Visual editor 26 may typically be used by the website building system 20 vendor internal staff and possibly by the vendor staff of the third-party application. However, website building system 20 may provide a further limited variant of such editor which may be used by site owners (e.g. to create custom or branded designs for cards generated by their site) or by external third parties. System 100 may also offer a separate editor for cards 70 and their elements (distinct from visual editor 26). The created cards 70 may then be offered through the card marketplace 101.

System 100 may allow widget definitions to be created in conjunction with the product page definitions. This typically applies to product-related widgets and not to other visual widget types (business analytics, chat etc.).

Such creation may be done manually by editing the widget definition simultaneously with the editing of the relevant product page (e.g. having a multi-view or multi-layer editor).

Alternatively, website building system 20 may allow the widget designer to select visual elements from the product page (or template) for use in a widget and possibly add display hints and data binding information.

It will be appreciated that a card 70 definition may have multiple widgets associated with it in card definitions repository 11e. This could be for any combination of the situations described herein above. These may include use of multiple widgets for presentation on multiple platforms or multiple display configurations (e.g. screen sizes or mobile vs. desktop), different users classes (e.g. display to site owner vs. site visitor), multiple possible card presentations (e.g. depending on the attributes specified for an underlying business object), multiple widgets used in different times or under different conditions (e.g. a pending order card shown to a site user can use 2 widgets, one which includes a cancelation option and one which doesn't depending on the availability of such cancelation option). Furthermore, a single card 70 may visually combine multiple widgets, e.g. an order card 70 may be associated with one widget which provides the card's main visual structure and options, and an additional set of widgets from which one may be dynamically selected (and possible adapted) by card creator 102 according to the actual set of attributes of the ordered product.

Widget creator 24 may then create the matching widget by automatically constructing a view displaying the specified fields, possibly using dynamic layout information associated with the visual elements. Widget creator 24 may allow user 60 to edit and re-arrange the automatically-constructed widget. Such a procedure is described in U.S. Pat. No. 9,747,258 entitled "System and Method for the Creation and Use of Visually-Diverse High-Quality Dynamic Layouts", issued Aug. 29, 2017 and assigned to the common assignee of the present invention.

Widget creator 24 may select a matching view from predefined views stored in widget repository 11a, or may select such a view and adapt it. Such a procedure is described (for example) for the dynamic matching and adaptation module which performs view to item matching as described in US Patent Publication US 2014/0282218.

Widget creator 24 may also select and/or adapt existing card views (or other design sources) and locate a set of matching views extracted from multiple sources, allowing user 60 to select the best view. Such a procedure is described (for example) for the layout search and generator and the layout filter and ranker as described in the U.S. Pat. No. 9,747,258 and US Patent Publication No. US 2016/0371312.

It will be appreciated that the same product page may be related to multiple widgets, e.g. an "order tracking" widget and a "product promotion" widget, having substantially different layout and design.

As discussed herein above, in some cases the product card system 10 display (and the card feed in particular) may be integrated with the website building system 20 display, e.g. as a side-by-side window display or as a newsfeed sub-frame inside website building system 20's own editing environment display or inside visual applications 21 created by website building system 20. This may also apply to standalone visual design applications 30 (both websites and mobile apps) which were created using a platform or technology providing an appropriate plug-in or interface to product card system 10.

In such a scenario, the website building system 20 owner may want to adapt the interface system display (fully or partially) to the look and feel of the visual application which "hosts" the product card system 10 display.

Visual adapter 25 may allow card widget designs to explicitly inherit styles and layout information from the hosting page (while possibly applying pre-defined default values in case the hosting page doesn't provide the relevant information).

Visual adapter 25 may allow the hosting page to explicitly override style and layout elements in the displayed cards as well as allowing the hosting page to provide an alternate widget template to be used by the relevant card 70 (subject to re-binding of the data of card 70 as performed by card creator 102).

An example of a card action scenario using system 100 may include a buyer requesting a shirt by sending a shirt request card to the store. The shirt request is a non-specific one, describing the shirts properties without providing an exact product ID (or link to a specific product in the e-shop).

The store owner returns with a transformed card 70 describing one or more alternative shirts (e.g. including a response gallery displaying options). This could be done through a matching process using product matcher 104 as described herein above. The matching could be made against the same e-shop, other e-shops in system 100 or external sites and e-shops. The process could be manually assisted by the e-shop operator (e.g. if he would like to add a possible offer from external sites for which the system does not have a product matching interface).

The buyer selects the desired shirt card 70 (or shirt-displaying gallery option) and orders it. The relevant visual application (e-shop or other) may determine that product stock is too low and if so creates an additional re-stocking card and sends it to the e-shop supplier.

In another scenario, the buyer takes a card 70 describing one of the shirts proposed by the shop owner. The buyer then transforms it into a request card 70 and transfers it to an alternative supplier. The alternative supplier then responds to the buyer.

In yet another scenario, the buyer takes a card 70 describing one of the shirts proposed by the shop owner and transforms it into a query card, possibly modifying the card and changing some attribute and conditions, e.g. "find shirt #5 but with shorter sleeves".

The buyer then requests that product card system 10 matches it against a possible product offering by a set of suppliers. These could be (for example) suppliers in general, suppliers selected according to specific criteria (e.g. "within 10 miles"), suppliers associated with relevant product classifications or suppliers followed by the buyer. In an alternative scenario, an additional system, such as the e-shop's ERP system may be added to system 100.

Another possible set of scenarios is the use of system 100 support site visitor interaction through chat.

Product card system 10 may support chat with an anonymous visitor (by providing a notification to the site manager). Product card system 10 may preserve the visitor's privacy, and will only share (as part of the notification and follow up chat session) limited information with site operator 60. Thus, product card system 10 may provide site operator 60 with information about the visitor's country of origin and the pages in the specific managed site visited by the visitor, but would not provide other information product card system 10 has on the specific visitor (such as information known to product card system 10 about the visitor's activities in other sites not managed by the same site operator 60).

The visitor may ask about a product (which he didn't locate). The visitor may also use a card 70 (from the same site or another site hosted by the system) as a model for the desired product.

The site manager may send a card 70 linking to a specific product together with an action (e.g. a "buy product X" card), including an embedded image with the details. Such a card 70 is essentially a "reverse order", sent from the site manager to the visitor (instead of the other way around). An order may arrive as a push notification on the interface application site manager's phone (if not made during the chat). The site manager can also send a "transfer to page" notification to the user to point the user directly to a given page in the site.

These chat scenarios are different from the ordering-related scenarios above in that the discussion is in the context of a chat session (with the visitor possibly remaining anonymous) rather than using explicit request/order cards. The chat cards may still include product references as discussed herein above.

It will be appreciated that system 100 may include several elements comparable to those found in a social networking system, such as the ability to "like" a product or a page through a built-in "like" mechanism, the ability to share a product, a page or a card by transferring it to third parties, the ability to follow or subscribe to specific sites (e.g. e-shops) and having a card feed reflecting system activity.

It will be further appreciated that system 100 may implement additional social network type features such as inter-user friend relationships and the creation of groups to which users may subscribe.

Applicants have realized that system 100 may differ from existing social network systems in having an underlying 3-entity model.

Figure 8A:
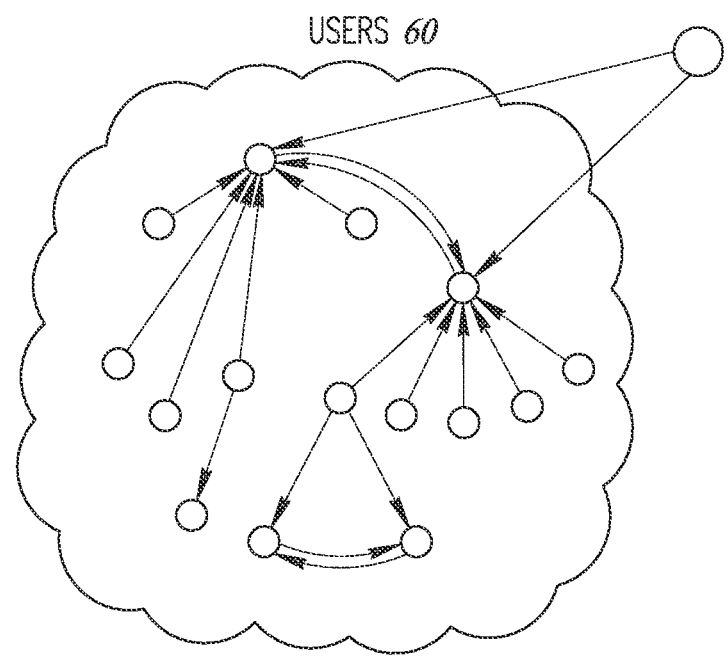
FIGS. 8A, 8B and 8C are schematic illustrations of different types of social networks.
Figure 8B:
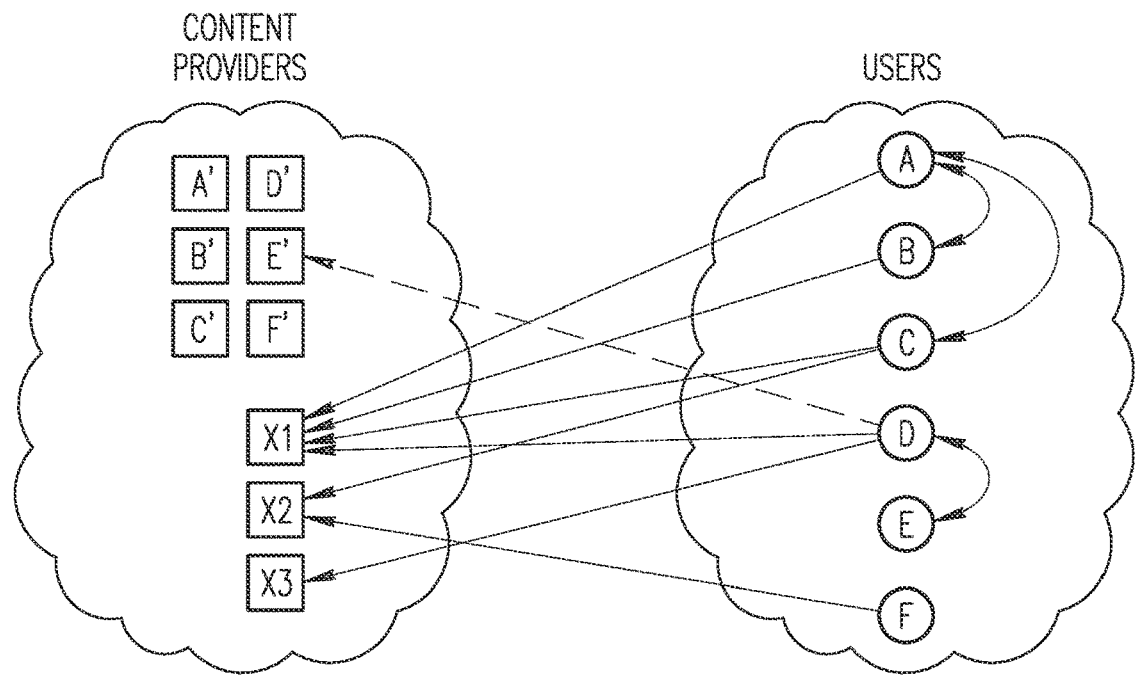
Figure 8C:
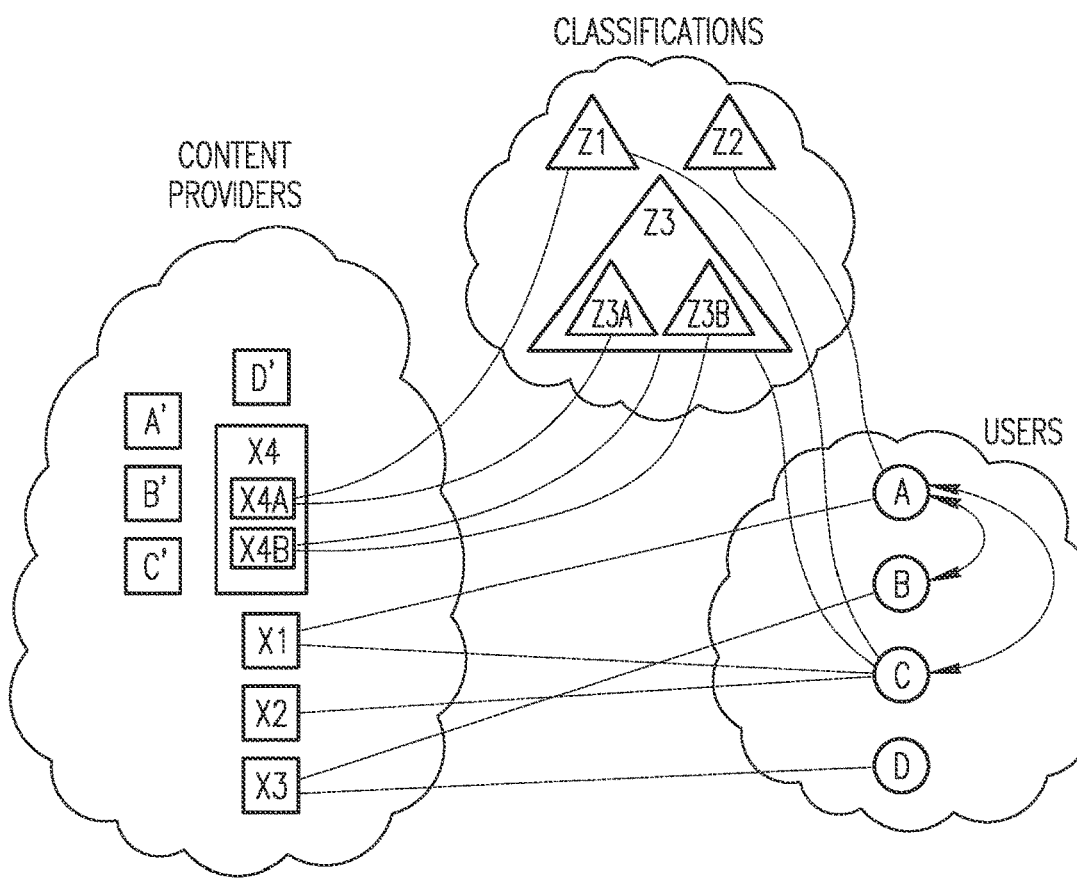

Reference is now made to FIGS. 8A, 8B and 8C which illustrate three types of social networks. It will be appreciated that some existing social networks (such as Twitter) have an underlying 1-entity model mainly based on users and their relationships (as illustrated in FIG. 8A to which reference is now made). In FIG. 8A, all the circles represent users. The circles within the clouds may be considered internal users i.e. those registered within system 100, and the circle outside of the cloud represents a sole external user that is not registered and therefore not known to system 100. Users may befriend (or in Twitter's case unidirectionally follow) other users and external (non-network users) may also visit or view network user information.

Other existing social networks (such as Facebook) have an underlying 2-entity model based on users and content providers (i.e. pages). Pages may include multiple page types (e.g. group, business, artist, brand, etc.) as well users' own personal pages. Users may subscribe to pages via group membership, page following or liking or (indirectly) through friend relationships.

Reference is now made to FIG. 8B which illustrates such a network containing personal pages A' to F' for users A to F and other pages (e.g. group, business or artist) X1 to X3. Users A, B and D subscribe (for example) to page X1. User D is also "soft subscribed" to page E' since user D is a friend of E.

Thus system 100 may comprise a 3-entity social network. Under this model, business object classifications (and product types in particular) may form a third set of objects in the social graph, in addition to the users and the content providers. Reference is now made to FIG. 8C which shows how a network may contain users (A to D), content provider pages (A' to D' and X1 to X4 with X4 containing X4A and X4B) and business object classifications (Z1 to Z3 with Z3 containing Z3A and Z3B).

Both content providers and users may create multiple associations with various such classifications, including both explicit associations (i.e. explicitly connecting to classifications) and implicit association (created for example by user 60 posting or sharing an item related to a specific classification).

As illustrated in FIG. 8C, a user A is associated with classification Z2 and user C is associated with classifications Z1 and Z3. Furthermore, content provider X4 includes content item X4A (associated with Z1 and Z3A) and content item X4B (associated with Z3 and Z3B).

It will be appreciated that an architecture may allow users 60 to follow a given classification/product class (e.g. leather outfits) and receive updates from multiple leather outfit sellers, without having to explicitly associate with any such seller.

It may also allow (for example) a mountain bicycle seller having a page within system 100 to contact all users associated with a specific subcategory of mountain bike associated users (such as full-suspension mountain bikes).

The architecture may also allow a content provider to link his entire page to a set of business object classifications. Alternatively, he may connect specific sub-elements of his page (e.g. specific blog post or suggested product) separately to their relevant business object classifications.

It may also allow queries to be made (by both users and content provider managers) based on the interconnection and association graph.

Thus system 100 may provide a system for linking users and systems with a feed of actions via product centered widget cards. System 100 also may implement such 3-entity social network as part of the system underlying card creation and use.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for a website building system (WBS) hosting multiple websites, the system comprising:
at least one processor; and
a message system running on said at least one processor to generate at least one actionable widget card for a user of a website built by said WBS, wherein said actionable widget card has elements comprising at least content, fields and attributes and implements at least e-commerce related operations for a product, said message system comprising:
a card creator to create at least one actionable widget according to a trigger from a website associated with said product, stored pre-defined rules concerning card definitions or pre-defined widget card parameters; and
a card transformer to transform at least one of: content, fields and attributes of said at least one actionable widget card according to transformation rules to create at least one new actionable widget card, and wherein a transformation is according to at least one of: a user request, related elements and product similarity.

2. The system according to claim 1 wherein said message system enables communication via said actionable widget card between at least one of: said WBS and said website, said website and at least one end user of said website and between said user of said WBS and a second user of said WBS.

3. The system according to claim 1 wherein said card transformer merges at least two actionable widget cards into a single actionable widget card according to at least one of: said user interests and said product similarity.

4. The system according to claim 1 wherein said card transformer splits at least one actionable widget card into at least two actionable widget cards.

5. The system according to claim 1 wherein said transformation rules are at least one of: generic system level rules and site-specific rules.

6. The system according to claim 1 wherein said transformation is according to a product comparison between said product and at least one like second product via a product semantic tree.

7. The system according to claim 1 wherein said transformation is according to product matching between said product and at least one like second product having a similar product classification or attributes.

8. The system according to claim 7 wherein said product matching comprises matching of partially specified business objects.

9. The system according to claim 1 wherein said transformation affects sorting order of said at least one actionable widget card for display.

10. The system according to claim 1 wherein said trigger is one of: a direct action of said user, a request from said user, an external real-world sensor event; a time-based activity and business or design analysis of said website.

11. A method for a website building system (WBS) hosting multiple websites, the method comprising:
 generating at least one actionable widget card for a user of a website built by said WBS, wherein said actionable widget card has elements comprising at least content, fields and attributes and implements at least e-commerce related operations for a product, said generating comprising:
  creating at least one actionable widget card according to a trigger from a website associated with said product, stored pre-defined rules concerning card definitions or pre-defined widget card parameters; and
  transforming at least one of: content, fields and attributes of said at least one actionable widget card according to transformation rules to create at least one new actionable widget card, and wherein a transformation is according to at least one of: a user request, related elements and product similarity.

12. The system according to claim 11 wherein said at least one actionable widget card enables communication between at least one of: said WBS and said website, said website and at least one end user of said website and-between said user of said WBS and a second user of said WBS.

13. The system according to claim 11 wherein said transforming merges at least two actionable widget cards into a single actionable widget card according to at least one of: said user interests and said product similarity.

14. The system according to claim 11 wherein said transforming splits at least one actionable widget card into at least two actionable widget cards.

15. The system according to claim 11 wherein said transformation rules are at least one of: generic system level rules and site-specific rules.

16. The system according to claim 11 wherein said transformation is according to a product comparison between said product and at least one like second product via a product semantic tree.

17. The system according to claim 11 wherein said transformation is according to product matching between said product and at least one like second product having a similar product classification or attributes.

18. The system according to claim 17 wherein said product matching comprises matching of partially specified business objects.

19. The system according to claim 11 wherein said transformation affects sorting order of said at least one actionable widget card for display.

20. The system according to claim 11 wherein said trigger is one of: a direct action of said user, a request from said user, an external real-world sensor event;
 a time-based activity and business or design analysis of said website.

* * * * *